(12) United States Patent
Horiuchi et al.

(10) Patent No.: US 6,844,679 B1
(45) Date of Patent: Jan. 18, 2005

(54) MERCURY LAMP, LAMP UNIT, METHOD FOR PRODUCING MERCURY LAMP AND ELECTRIC LAMP

(75) Inventors: Makoto Horiuchi, Nara (JP); Makoto Kai, Osaka (JP); Mamoru Takeda, Kyoto (JP); Tsuyoshi Ichibakase, Osaka (JP); Tomoyuki Seki, Osaka (JP); Yoshiki Kitahara, Osaka (JP); Toshio Mori, Kyoto (JP); Yasuo Takeuchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

(21) Appl. No.: 10/111,067
(22) PCT Filed: Jul. 6, 2000
(86) PCT No.: PCT/JP00/04561
§ 371 (c)(1),
(2), (4) Date: Apr. 18, 2002
(87) PCT Pub. No.: WO01/29862
PCT Pub. Date: Apr. 26, 2001

(30) Foreign Application Priority Data

Oct. 18, 1999 (JP) .......................................... 11/295043

(51) Int. Cl.[7] .............................................. H01J 17/20
(52) U.S. Cl. ....................... 313/642; 313/639; 313/638
(58) Field of Search ............................. 313/637–642, 313/113, 25, 631, 632, 491; 501/54

(56) References Cited

U.S. PATENT DOCUMENTS

| | | | | |
|---|---|---|---|---|
| 2,904,710 A | * | 9/1959 | Beeninga et al. ............. 313/25 |
| 5,109,181 A | | 4/1992 | Fischer et al. | |
| 5,236,483 A | * | 8/1993 | Miyashita et al. ........... 65/17.2 |
| 5,326,729 A | * | 7/1994 | Yaba et al. .................... 501/54 |
| 5,451,838 A | | 9/1995 | Kawai | |
| 5,572,091 A | * | 11/1996 | Langer et al. ............... 313/636 |
| 5,665,133 A | * | 9/1997 | Orii et al. ..................... 65/17.6 |
| 6,211,616 B1 | * | 4/2001 | Takeuti et al. .............. 313/637 |
| 6,489,723 B2 | * | 12/2002 | Miyanaga .................... 313/632 |
| 2002/0014842 A1 | | 2/2002 | Horiuchi et al. | |

FOREIGN PATENT DOCUMENTS

| | | |
|---|---|---|
| JP | 63237346 A | 10/1988 |
| JP | 2-148561 | 6/1990 |
| JP | 6-111770 | 4/1994 |
| JP | 6-187944 | 7/1994 |
| JP | 06305768 A | 11/1994 |
| JP | 6-338285 | 12/1994 |
| JP | 09165641 A | 6/1997 |
| JP | 9-245728 | 9/1997 |
| JP | 9-306428 | 11/1997 |
| JP | 11-149899 | 6/1999 |
| JP | 2001229876 A * | 8/2001 ............ H01J/61/20 |

OTHER PUBLICATIONS

International Search Report—PCT/JP00/04561, ISA/JPO, Oct. 3, 2000.
International Preliminary Examination Report—PCT/JP00/04561 (page with references cited) IPEA/JPO.

* cited by examiner

Primary Examiner—Nimeshkumar D. Patel
Assistant Examiner—Karabi Guharay
(74) Attorney, Agent, or Firm—Harness, Dickey & Pierce, P.L.C.

(57) ABSTRACT

The present invention provides a high-pressure discharge lamp 100 including a luminous bulb 10 enclosing at least a rare gas and halogen in the bulb and made substantially of quartz glass; and an electrode 12 made substantially of tungsten and disposed in the luminous bulb. The mole number of the halogen is larger than the sum of the total mole number of metal elements (except the tungsten element and the mercury element) that have the property of bonding to the halogen and are present in the luminous bulb 10 and the mole number of the tungsten present in the luminous bulb by evaporation from the electrode 12 during lamp operation.

43 Claims, 13 Drawing Sheets

MERCURY LAMP, LAMP UNIT, METHOD FOR PRODUCING MERCURY LAMP AND ELECTRIC LAMP

TECHNICAL FIELD

The present invention relates to a high-pressure discharge lamp, a lamp unit, a method for producing a high-pressure discharge lamp and an electric lamp. In particular, the present invention relates to a high-pressure discharge lamp used for general illumination, and liquid crystal projectors or projection type liquid crystal television in combination with a reflecting mirror.

BACKGROUND ART

Specific examples of a conventional high-pressure discharge lamp include the high-pressure mercury vapor discharge lamps disclosed in Japanese Laid-Open Patent Publication No. 2-18561 and Japanese Patent Publication No. 2980882. FIG. 13 schematically shows a structure of the high-pressure discharge lamps disclosed in these publications. Hereinafter, the conventional high-pressure discharge lamp 1000 will be described with reference to FIG. 13.

The lamp 1000 includes a luminous bulb (bulb) 110 made of quartz glass and a pair of sealing portions (seal portions) 120 coupled to both ends of the luminous bulb 110. Inside the luminous bulb 110 (discharge space), a pair of tungsten electrodes (W electrodes) made of tungsten are opposed to each other with a predetermined distance. One end of the W electrode 112 is welded to a molybdenum foil (Mo foil) 124 in the sealing portion 120, so that the W electrodes 112 and the foils 124 are electrically connected. An external lead (Mo rod) 130 made of molybdenum is electrically connected to one end of the Mo foil 124.

Japanese Laid-Open Patent Publication No. 2-18561 discloses a high-pressure discharge lamp having the same structure as shown in FIG. 13 in which a rare gas, 200 mg/cc or more of mercury 118 and halogen in the range of $10^{-3}$ to $10^{-1}$ µmol/cc are enclosed in the luminous bulb 110 and which is operated with a bulb wall load of 100 W/cm$^2$ or more.

Japanese Laid-Open Patent Publication No. 2-18561 describes the following. When the bulb wall load is increased to 100 W/cm$^2$ or more, the temperature at the coldest point can be increased. Therefore, when mercury is enclosed in an amount 200 mg/cc or more, the pressure in the luminous bulb 110 is increased, and continuous spectrum, especially in a red region, is increased so that the color rendering property can be improved. In addition, it is described that the reason why halogen is enclosed is to prevent the blackening of the luminous bulb 110, but there is no specific description of a clear reason why the amount of halogen enclosed is defined to be in the range of $10^{-3}$ to $10^{-1}$ µmol/cc.

On the other hand, Japanese Patent Publication No. 2980882 discloses a high-pressure discharge lamp having the same structure as shown in FIG. 13 in which a rare gas, 160 mg/cc or more of mercury 118 and halogen in the range of $2 \times 10^{-1}$ to 7 µmol/cc are enclosed in the luminous bulb 110 and which is operated with a bulb wall load of 80 W/cm$^2$ or more.

Japanese Patent Publication No. 2980882 describes the following speculation. When the discharge lamp is operated at a bulb wall load of 80 W/cm$^2$ or more, the temperature of the luminous bulb 110 is increased so that the absorption wavelength band of quartz glass is shifted to the long wavelength side. Therefore, mercury-rare gas excimer light with a wavelength of 185 nm (which is light radiated by discharge in a mixed gas of a high-pressure mercury vapor and a rare gas when mercury 118 is enclosed in an amount of 160 mg/cc or more) easily can be absorbed. As a result, opaqueness and devitrification of the quartz glass are grown rapidly. Furthermore, it is described that Si or SiO is released from the quartz glass that has absorbed ultraviolet rays with a short wavelength, and they are attached to the heads of the electrodes 112 so that the melting point of tungsten is reduced, so that deformation of the electrodes 112 or blackening of the bulb wall of tungsten occur.

Regarding this problem, Japanese Patent Publication No. 2980882 describes that the opaqueness and the devitrification of the quartz glass are prevented by enclosing halogen in the range of $2 \times 10^{-1}$ µmol/cc or more to let the halogen absorb the excimer light. It is also described that the halogen is enclosed in an amount of 7 µmol/cc or less in order to prevent the deformation of the electrodes 112. Furthermore, it is disclosed that in order to suppress the growth of the opaqueness and the devitrification, the average concentration of OH groups on the inner surface (a depth of within 0.2 mm) of the quartz glass is defined to 20 ppm or less.

Moreover, this publication describes the following. Carbon atoms are attached on the inner surface of the luminous bulb 110 during operation of the lamp and absorb ultraviolet rays, which consequently promotes the opaqueness and the devitrification. Therefore, halogen is enclosed in the luminous bulb 110 in the form of not a compound containing carbon ($CH_2Br_2$ etc), but, for example, hydrogen bromide (HBr). Furthermore, it is described that the higher the ratio of aluminum and alkali metals (sodium, potassium, and lithium) in the quartz glass is, the higher the viscosity of the glass is, so that the speed of the opaqueness and the devitrification (crystal growth of $SiO_2$) is reduced. Then, it is described that such a specification can provide a high-pressure discharge lamp having a lifetime of about 2000 hours, which is required as a liquid crystal projector.

In the conventional high-pressure discharge lamp 1000, as shown in the above publications, the blackening or the opaqueness and the devitrification of the luminous bulb 110 are prevented by halogen.

The inventors of the present invention produce high-pressure discharge lamps containing various kinds of halogen for testing based on the techniques and the specifications disclosed in the above publications, and a lifetime test was conducted by incorporating the produced lamps in reflecting mirrors, and changes in the illuminance of a screen such as a liquid crystal projector were examined. Then, it was found that the illuminance of the screen was significantly reduced in a lamp operation time of about several tens hours to several hundreds hours. In particular, the obtained results showed that for high output lamps with 50 W or more, which are not disclosed in Japanese Laid-Open Patent Publication No. 2-18561, the illuminance reduction was significant. Furthermore, it was found that in these conventional lamps, as the operation time becomes longer, the voltage at the start of discharge becomes higher, so that the lamps become difficult to operate.

As a result of observing these lamps in detail, the inventors of the present application learned the following. First, in an early time immediately after the operation, the tungsten of the electrode 112 is attached to the inner surface of the luminous bulb 110 so that the luminous bulb 110 is blackened (blackening). Then, the blackening proceeds rapidly, and the blackening causes the transmittance of the luminous bulb 110 to be reduced significantly. Consequently, the qunatity of light emitted from the luminous bulb 110 is reduced. These results of observation indicate that the blackening or the opaqueness and the devitrification of the luminous bulb 110 cannot completely be prevented even if halogen is enclosed in the luminous bulb 110 only by using the techniques and the specifications disclosed in the above publications. Therefore, In the conventional lamp 1000 disclosed in the above publications, the optical output is reduced in an early time after the lamp is operated.

In a liquid crystal projector that projects a screen of a personal computer in a larger scale (so-called data projector), it seems that when the conventional lamp 1000 of this kind was used, the short lifetime of the lamp was not very large problem. This is because in such applications, in most cases, the projector was used for general public for a relatively short time in such occasions as conferences in companies or schools, so that there was substantially no need of exchanging lamps frequently, and therefore there was no burden on the user.

However, when the conventional lamp 1000 is used for television (projection television) for ordinary homes, the short lifetime of the conventional lamp 1000 is a large problem. That is to say, at the present when TV programs of several tens of channels are broadcast in ordinary homes, as typified by digital broadcasting, there is an increasing demand for enjoying these broadcast programs with a multiscreen or having a large amount of character information displayed together with images in a large screen television at home. To meet this demand, the development to apply the data projector that can provide large screen images to television for ordinary homes (projection television) has been started full-fledgedly. In this application, television is used for many hours a day, so that the operation time of the lamp is naturally longer than that when used in the data projector. Furthermore, it is in demand that exchange of lamps is unnecessary or is limited to a number of times as small as possible. In order to meet this demand, the lifetime of the lamp is required to be at least 5000 hours to 100000 hours or more. However, the conventional lamp 1000 cannot provide the lamp lifetime of 5000 hours to 100000 hours or more, which is required by projection type liquid crystal televisions.

The present invention is carried out in view of these points, and it is a main object of the present invention to provide a high-pressure discharge lamp having a long life.

DISCLOSURE OF INVENTION

A first high-pressure discharge lamp of the present invention includes a luminous bulb enclosing at least a rare gas and halogen in the bulb and made substantially of quartz glass; and an electrode made substantially of tungsten and disposed in the luminous bulb, wherein the mole number of the halogen is larger than the sum of the total mole number of metal elements (except a tungsten element and a mercury element) that have the property of bonding to the halogen and are present in the luminous bulb and the mole number of the tungsten present in the luminous bulb by evaporation from the electrode during lamp operation.

It is preferable that when Mi denotes each kind of the metal elements (except the tungsten element and the mercury element), and mi is the mol number of the metal element Mi, and ni is the stoichiometric coefficient of the metal element Mi, the mole number of the halogen is larger than the sum of the mole number of the tungsten and the total number ($\Sigma(mi \times ni)$) obtained by adding mole numbers of all the kinds of the metal element Mi that are obtained by multiplying the mole number mi of the metal element Mi by the stoichiometric coefficient ni.

A second high-pressure discharge lamp of the present invention includes a luminous bulb enclosing at least a rare gas and halogen in the bulb and made substantially of quartz glass; and an electrode made substantially of tungsten and disposed in the luminous bulb, wherein in the case where halogen enclosed in the luminous bulb is denoted by X, the mole number of the halogen X is denoted by N, each kind of metal elements that have a property of bonding to the halogen X and are present in the luminous bulb is denoted by Mi, the mole number of the metal element Mi is denoted by mi, the stoichiometric coefficient of the metal element Mi is denoted by ni, and tungsten is denoted by W, when the equilibrium constant in a chemical reaction of the following formula (I) is denoted by Ki ($Mi+niX \rightarrow MiX_{ni}$ (I)), and the equilibrium constant in a chemical reaction of the following formula (II) is denoted by Kw ($W+X \rightarrow WX$ (II)), then the mole number N of the halogen X enclosed in the luminous bulb is larger than the sum of the total mole number of the metal elements Mi having an equilibrium constant Ki of the equilibrium constant Kw or more and the mole number of the tungsten W present in the luminous bulb by evaporation from the electrode during lamp operation.

It is preferable that the mole number N of halogen X is larger than the sum of the mole number of the tungsten and the total mole number ($\Sigma(mi \times ni)$) obtained by adding the mole numbers of all the kinds of the metal element Mi that are obtained by multiplying the mole number mi of the metal element Mi having an equilibrium constant Ki of the equilibrium constant Kw or more by the stoichiometric coefficient ni.

In an embodiment of the present invention, the metal element is at least one selected from the group consisting of sodium (Na), potassium (K), lithium (Li), chromium (Cr), iron (Fe), and nickel (Ni).

It is preferable that the content of hydrogen (H) contained in the luminous bulb is 0.15% by volume or less.

It is preferable that a tensile stress on an outer surface of the luminous bulb is 100 psi or less, and a compressive stress on an inner surface of the luminous bulb is 100 psi or less.

A third high-pressure discharge lamp includes a luminous bulb enclosing at least a rare gas and halogen in the bulb and made substantially of quartz glass; and an electrode made substantially of tungsten and disposed in the luminous bulb, wherein the mole number of the halogen enclosed in the luminous bulb is larger than the sum of a total mole number of sodium (NE), potassium (K), and lithium (Li) that are present in the luminous bulb and a mole number of the tungsten present in the luminous bulb by evaporation from the electrode during lamp operation.

It is preferable that the mole number of the halogen is larger than the sum of the total mole number of sodium (Na), potassium (K), lithium (Li), cesium (Cs) and rubidium (Rb) that are present in the luminous bulb and the mole number of the tungsten.

A fourth high-pressure discharge lamp of present invention includes a luminous bulb enclosing at least a rare gas and halogen in the bulb and made substantially of quartz glass; and an electrode made substantially of tungsten and disposed in the luminous bulb, wherein a mole number of the halogen enclosed in the luminous bulb is larger than a sum of a total mole number of metal elements that are present in the luminous bulb and produce a monovalent halide and a mole number of the tungsten present in the luminous bulb by evaporation from the electrode during lamp operation.

A fifth high-pressure discharge lamp of the present invention includes a luminous bulb enclosing at least a rare gas and halogen in the bulb and made substantially of quartz glass; and an electrode made substantially of tungsten and disposed in the luminous bulb, wherein a content of each of sodium (Na), potassium (K), and lithium (Li) contained in the electrode is 1 ppm or less.

It is preferable that a content of each of sodium (Na), potassium (K), and lithium (Li) contained in the quartz glass in the luminous bulb is 1 ppm or less.

It is preferable that the mole number of the halogen enclosed in the luminous bulb is larger than the total mole number of sodium (Na), potassium (E), and lithium (Li) that are present in the electrode.

It is preferable that the mole number of the halogen enclosed in the luminous bulb is at least five times larger than the total mole number of sodium (Na), potassium (K), and lithium (Li) that are present in the electrode.

It is preferable that the content of chromium (Cr), iron (Fe), and nickel (Ni) contained in the electrode is 3 ppm or less.

It is preferable that the mole number of the halogen enclosed in the luminous bulb is larger than the total mole number of sodium (Na), potassium (K), lithium (Li), chromium (Cr), iron (Fe), and nickel (Ni) that are present in the electrode.

It is preferable that the mole number of the halogen enclosed in the luminous bulb is at least five times larger than the total mole number of sodium (Na), potassium (K), lithium (Li), chromium (Cr), iron (Fe), and nickel (Ni)that are present in the electrode.

A sixth high-pressure discharge lamp of the present invention includes a luminous bulb enclosing at least a rare gas and halogen in the bulb and made substantially of quartz glass; and an electrode made substantially of tungsten and disposed in the luminous bulb, wherein the content of each of sodium (Na), potassium (K), and lithium (Li) contained in the quartz glass in the luminous bulb is 1 ppm or less.

It is preferable that the content of hydrogen (H) contained in the luminous bulb is 0.15% by volume or less.

It is preferable that the tensile stress on an outer surface of the luminous bulb is 100 psi or less, and the compressive stress on an inner surface of the luminous bulb is 100 psi or less.

It is preferable that the content of OH groups contained in the quartz glass in luminous bulb is 5 ppm or less.

It is preferable that the content of aluminum (Al) contained in the quartz glass in luminous bulb is 10 ppm or less.

It is preferable that the amount of halogen enclosed in the luminous bulb is 100 $\mu mol/cm^3$ or less.

In an embodiment of the present invention, the halogen enclosed in the luminous bulb is at least one of bromine (Br) or iodine (I).

It is preferable that the bulb wall load of the luminous bulb is 80 $W/cm^2$ or more.

In an embodiment of the present invention, mercury (Hg) is further enclosed in the luminous bulb.

It is preferable that the amount of the hydrogen (Hg) enclosed in the luminous bulb is from 150 $mg/cm^3$ to 300 $mg/cm^3$, and the mercury vapor pressure during lamp operation is from 15 MPa to 30 MPa.

A lamp unit of the present invention includes the above-described discharge lamp and a reflecting mirror for reflecting light emitted from the discharge lamp.

A method for producing a high-pressure discharge lamp of the present invention is a method for producing a high-pressure discharge lamp including a luminous bulb enclosing at least a rare gas and halogen in the bulb and made substantially of quartz glass; and an electrode made substantially of tungsten and disposed in the luminous bulb, and the method includes the steps of completing a shape of a high-pressure lamp to obtain a finished lamp shaped structure; and then removing a residual strain of the finished lamp shaped structure.

In an embodiment of the present invention, the step of removing a residual strain includes the step of storing the finished lamp shaped structure under a high temperature from 1000° C. to 1100° C. for one hour or more.

It is preferable that the step of storing under a high temperature is performed for 100 hours or more.

An electric lamp of the present invention includes a bulb enclosing at least a rare gas and halogen therein; and a filament that connects a pair of internal leads arranged in the bulb and made substantially of tungsten, wherein a mole number of the halogen is larger than a sum of a total mole number of metal elements (except a tungsten element) that have a property of bonding to the halogen and are present in the luminous bulb and a mole number of the tungsten present in the luminous bulb by evaporation from the filament during lamp operation.

According to the present invention, the mole number of halogen is larger than the sum of the total mole number of metal elements that are present in the luminous bulb (except tungsten and mercury) and the mole number of the tungsten present in the luminous bulb that has been evaporated from the electrodes during lamp operation. Therefore, the blackening of the luminous bulb can be prevented. As a result, a high-pressure discharge lamp having a long life can be provided. Even if the bulb wall load of the luminous bulb is 80 $W/cm^2$ or more, the blackening of the luminous bulb can be prevented. Consequently, the present invention can provide a high-pressure discharge lamp that has a long life (for example, 5000 hours to 10000 hours or more), even if the lamp is used under high output conditions that end the lamp life early in the prior art.

BEST MODE FOR CARRYING OUT THE INVENTION

Hereinafter, embodiments of the present invention will be described.

First, prior to describing the embodiments of the present invention, the mechanism that causes blackening in a luminous bulb of a high-pressure discharge lamp will be described. The mechanism that causes blackening in a high-pressure discharge lamp enclosing halogen has not been definitely clear, but the inventors of the present invention conducted various experiments and conducted analysis based on chemical equilibrium. The results led them to infer that the blackening proceeds through the following mechanism.

Figure 14A:
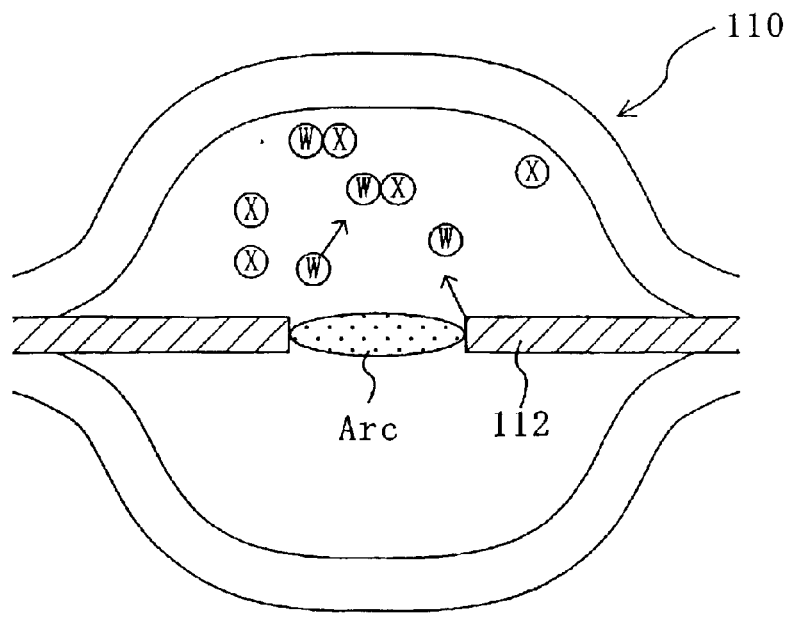
FIG. 14 shows enlarged views schematically showing a luminous bulb during lamp operation.

FIG. 14 is a schematically enlarged view of a luminous bulb during lamp operation. As shown in FIG. 14A, tungsten (W) is evaporated substantially from the heads (a high temperature arc of several thousands degrees or more is in contact with the heads) of the electrodes 112 that is in a state of a high-temperature close to the melting point during lamp operation. The evaporated tungsten passes by the periphery of the high-temperature discharge arc and moves toward the inner wall of the luminous bulb 110 that has been heated generally to several hundreds of degrees Celsius to a thousand and several hundreds of degrees Celsius, as shown in FIG. 14A. If the evaporated tungsten (W) is bonded to halogen (X) to be formed into tungsten halide (WX) during this movement, the tungsten halide is not attached onto the inner surface of the high-temperature luminous bulb 110 that has been heated to several hundreds of degrees Celsius, or more during operation. This is because tungsten halide is evaporated readily at the temperature at which the lamp is operated, so that even if the tungsten halide is attached onto the inner surface of the luminous bulb 110, it easily can be detached from the inner surface of the luminous bulb 110.

Figure 14B:
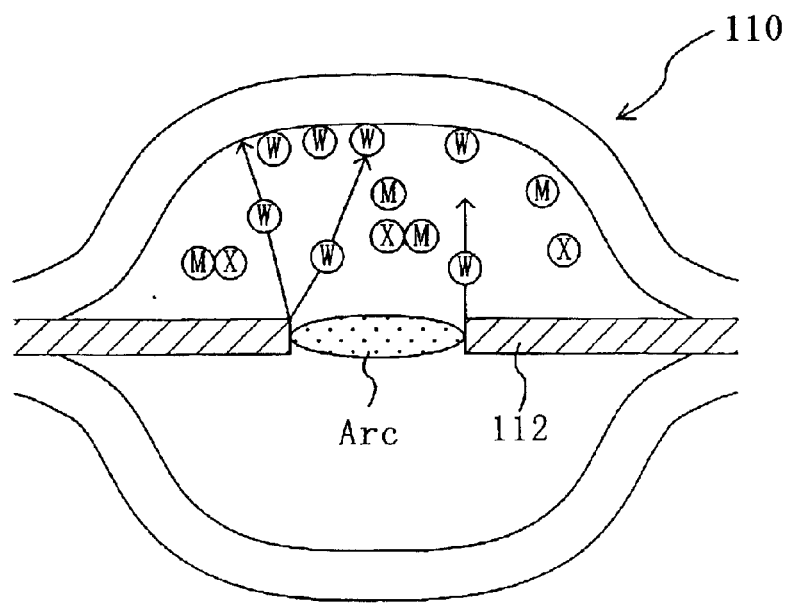

However, as shown in FIG. 14B, if a metal element (M) is present in the luminous bulb 110 other than the evaporated tungsten (W), halogen (X) is bonded to that metal element (M) before bonded to the tungsten (W) and forms a halogenated compound (Mx). This is because the equilibrium constant of chemical reaction of halogen with almost all metal elements except mercury is larger than that of tungsten with halogen in the temperature region (especially a temperature region from 2000 to 3000° C. in the periphery of the arc to several hundreds of degrees Celsius in the vicinity of the inner surface of the luminous bulb 110) in the luminous bulb 110. This means that when tungsten (W), a metal element (M) and halogen (X) are present, the metal element (M) and the halogen (X) are first reacted. Thus, only halogen that is left as unnecessary from the reaction of the metal element and halogen is reacted with tungsten Therefore, when the number of metal elements present in the luminous bulb 110 is larger than that of halogen, there is no free halogen that will be bonded to the evaporated tungsten.

Therefore, the tungsten reaches the inner wall of the luminous bulb 110 in the form as it is and is attached thereto. As a result, that portion is blackened.

From the above, when a metal element (M) is present in the luminous bulb 110 for some reason, blackening of the luminous bulb 110 is not completely prevented simply by enclosing halogen in the amount described in the above-described publications. In order to solve this problem, in the present invention, the mole number of halogen (X) enclosed in the luminous bulb is larger than the sum of the total mole number of the metal elements (M) and the mole number of tungsten (W) evaporated during lamp operation. With this, all the tungsten (W) evaporated from the electrodes is bonded to halogen (X) to be formed into tungsten halide (WX). As a result, the tungsten (W) is prevented from being attached onto the inner surface of the luminous bulb. Consequently, the present invention can prevent blackening of the luminous bulb of a high-pressure discharge lamp, and thus can provide a high-pressure discharge lamp having an longer life than that of the prior art.

Hereinafter, embodiments of the present invention will be described more specifically with reference to the accompanying drawings. However, the following embodiments are only examples and the present invention is not limited thereto.

(Embodiment 1)

Embodiment 1 of the present invention will be described with reference to FIGS. 1 to 7.

Figure 1:
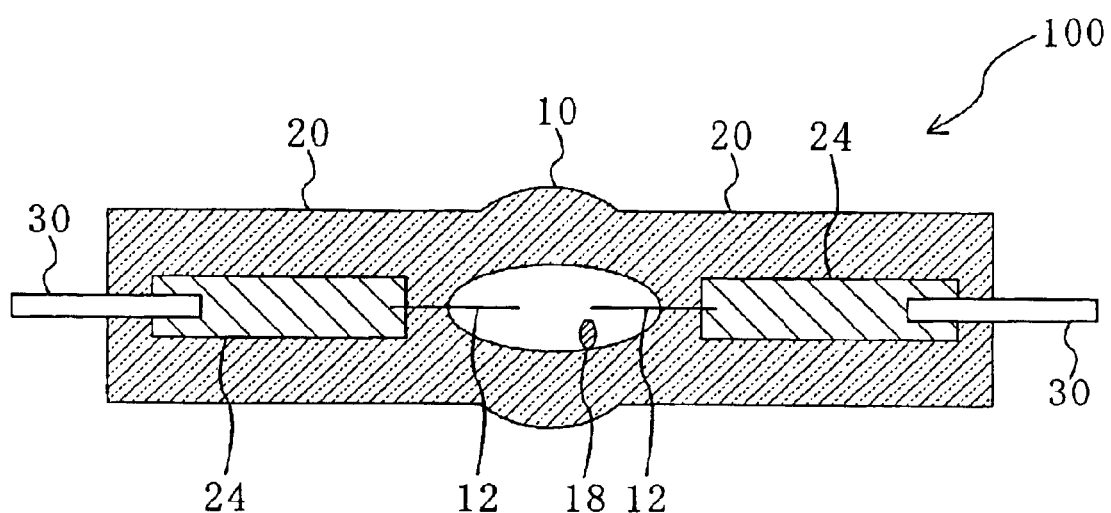
FIG. 1 is a cross-sectional view schematically showing a structure of a high-pressure discharge lamp 100 of an embodiment of the present invention.

First, FIG. 1 schematically shows the structure of a high-pressure discharge lamp 100 of the present invention. The discharge lamp 100 includes a luminous bulb 10 made substantially of quartz glass and electrodes 12 made substantially of tungsten arranged in the luminous bulb 10. At least a rare gas and halogen are enclosed in the luminous bulb 10, and the mole number of the halogen enclosed in the luminous bulb 10 is larger than the sum of the total mole number of metal elements (except the tungsten element and the mercury element) that have the property of bonding to halogen and are present in the luminous bulb 10, and the mole number of the tungsten present in the luminous bulb 10 by evaporation from the electrodes 12 during lamp operation.

In this embodiment, a pair of sealing portions (seal portions) 20 are coupled to both ends of the luminous bulb 10 of the lamp 100, and the sealing portions 20 maintain airtightness inside the luminous bulb 10 (discharge space). A pair of electrodes (W electrodes) 12 are opposed to each other with a predetermined space, and for example, they are arranged such that the distance between the heads of the luminous bulb 12 (distance between the electrodes) is about 1.5 mm. Also a coil can be wound around the heads of the electrodes 12 for the purpose of reducing the temperature of the electrode heads during lamp operation.

The inner volume of the luminous bulb 10 (volume of the discharge space) is about 0.2 cc (about 0.2 cm$^3$). About 30 mg of mercury 18 (the amount of mercury per unit luminous bulb inner volume: about 150 mg/cc), argon gas (not shown) at about 20 KPa at room temperature and $CH_2Br_2$ (not shown) at about 60 Pa are enclosed in the luminous bulb 10. The outer diameter of the luminous bulb 10 is about 13 mm, and the glass thickness of the luminous bulb 10 is about 3 mm.

One end of the electrode 12 arranged in the luminous bulb 10 is welded to a metal foil (e.g., molybdenum foil) 24 in the sealing portion 20, and the electrode 12 and the metal foil 24 are electrically connected to each other. One end of the metal foil 24 is electrically connected to an external lead (Mo rod) 30 made of molybdenum.

The high-pressure discharge lamp 100 of this embodiment is constituted such that the mole number of halogen is larger than the sum of the total mole number of metal elements except the tungsten element and the mercury element and the mole number of the tungsten evaporated from the electrodes 12 during lamp operation. This structure can prevent the blackening of the luminous bulb 10 better than the prior art for the following reason.

Figure 2:
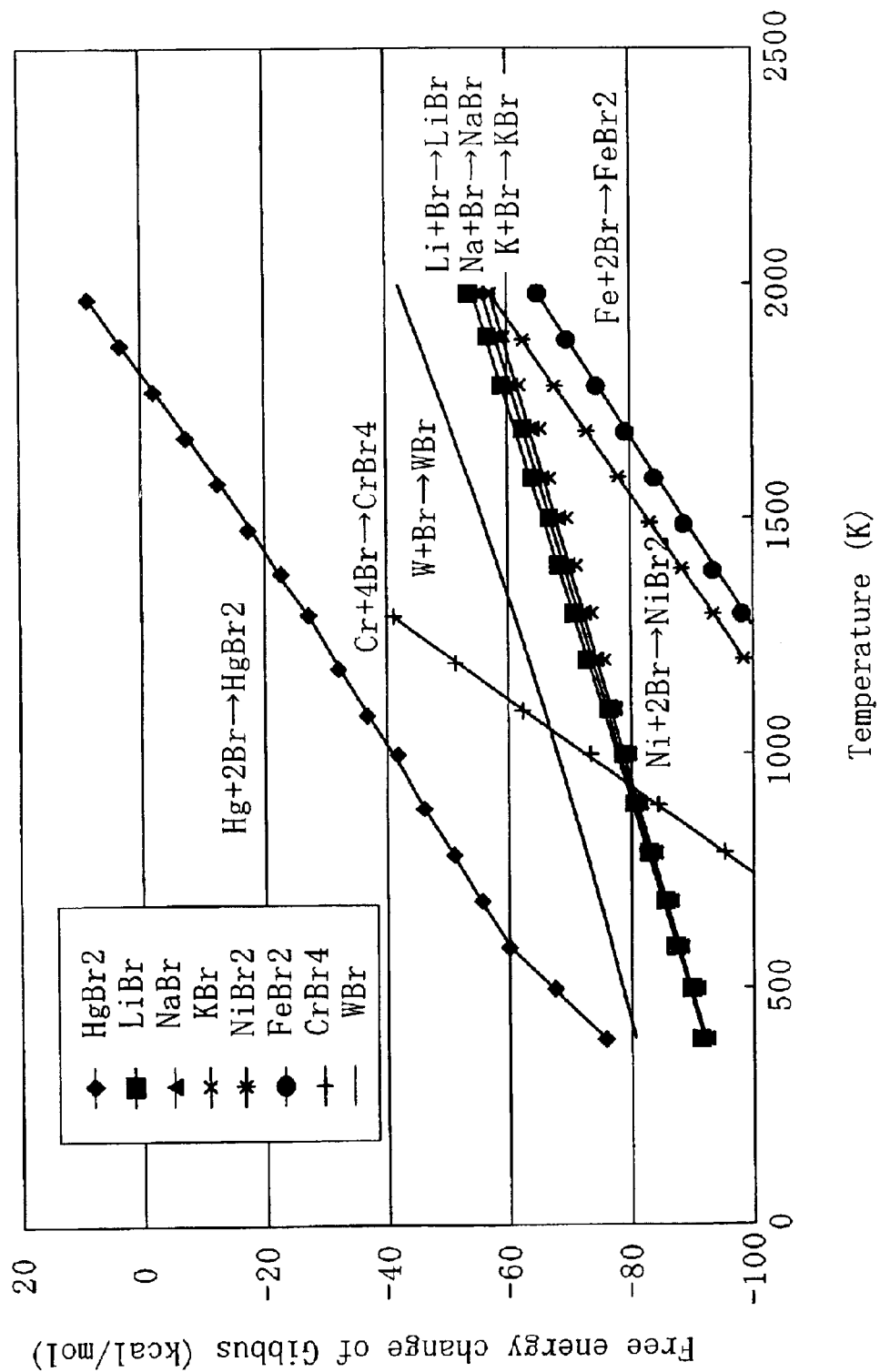
FIG. 2 is a graph showing the relationship between the free energy changes (ΔG) of chemical reaction of various metals with halogen and the temperature (K).

The equilibrium constant of chemical reaction of almost all metal elements except the mercury element (Hg) with halogen is larger than that of chemical reaction of tungsten with halogen, so the chemical reaction of metal elements (except Hg) with halogen proceeds more easily than the chemical reaction of tungsten with halogen. FIG. 2 is a graph of the function of the equilibrium constant K of the chemical reaction of various metal elements with halogen with respect to the temperature. FIG. 2 shows the relationship between the temperature and the equilibrium constant K of the chemical reaction where tungsten (W), lithium (Li), sodium (Na), potassium (K), chromium (Cr), iron (Fe), Nickel (Ni) and mercury (Hg) are reacted with bromine (Br), which is a halogen.

In FIG. 2, the equilibrium constant K is plotted with the free energy changes of Gibbs ($\Delta G=-RT\ln(K)$), which has a logarithmic relationship with the equilibrium constant K, as the vertical axis and the temperature T (Kelvin) as the horizontal axis for sensorially easy understanding. Herein, R in the equation $\Delta G=-RT\ln(K)$ represents the gas constant. The range of the temperature T corresponds to the temperature region in the luminous bulb 10. The equilibrium constant shown in FIG. 2 was calculated based on the thermodynamic data described in "Thermodynamic Properties of Elements and Oxides" and "Thermodynamic Properties of Halides" published by National Technical Information Service in the U.S.A.

As seen from FIG. 2, the free energy change ($\Delta G$) of chemical reactions where each of lithium (Li), sodium (Na), potassium (K), chromium (Cr), iron (Fe) and Nickel (Ni), except mercury (Hg), is reacted with bromine (Br) is smaller than the free energy change (AG) of a chemical reaction where tungsten is reacted with bromine in the range from 2000 to 3000° C. in the periphery of the arc in the luminous bulb 10 to several hundreds of degrees Celsius in the vicinity of the inner surface of the luminous tube. As the value of the free energy change ($\Delta G$) (as the negative value is larger, that is, as the value goes down in the vertical axis), the reaction occurs more easily, and thus the graph indicates that the reaction of the metal elements except mercury with bromine occurs more easily than the reaction of tungsten with bromine. On the other hand, regarding the reaction of mercury with bromine, since the value of the free energy change (AG) is large, the reaction is difficult to occur. Furthermore, this can be understood from the fact that the equilibrium constant of a chemical reaction of metal elements (e.g., lithium) except mercury with bromine is larger than that of the chemical reaction of tungsten with bromine when the equilibrium constant is obtained from the free energy change ($\Delta G=-RT\ln(K)$).

From the above, if a metal element (except mercury) is present other than the tungsten evaporated substantially from the heads (which are in contact with an arc having a high temperature of several thousands of degrees or more) of the electrodes that is heated to a high temperature close to the melting point during lamp operation, halogen is bonded to the metal element before being bonded to the tungsten while the halogen moves toward the inner surface of the luminous bulb (this portion generally has a temperature of several hundreds of degrees Celsius to a thousand and several hundreds of degrees Celsius) through the periphery of the discharge arc of 2000° C. to 3000° C.

However, halogen for reaction with the tungsten evaporated from the electrodes 12 can be constantly ensured by making the amount of the metal element (which does not include the tungsten that constitutes the solid electrodes arranged in the luminous bulb 10) presenting the luminous bulb except mercury smaller than the amount of the halogen enclosed.

More generally speaking from an aspect of chemical equilibrium, in the case where halogen enclosed in the luminous bulb 10 by denoted by X, the mole number of the halogen X is denoted by N, various metal elements present in the luminous bulb that have the property of bonding to halogen X are denoted by Mi (e.g., Li, Na, K, etc.), the mole number of the metal element Mi is denoted by mi, the stoichiometric coefficient of the metal element Mi is denoted by ni ("1" in the cases of Li, Na and K), and tungsten is denoted by W, the equilibrium constant in the chemical reaction of the following formula (I) is denoted by Ki: $Mi+niX \rightarrow MiX_{ni}$(I), and the equilibrium constant in the chemical reaction of the following formula (II) is denoted by Kw: $W+X \rightarrow WX$ (II), when the sum of the total mole number of the metal elements Mi (except the tungsten element with the equilibrium constant Kw=the equilibrium Ki) having an equilibrium constant Ki of the equilibrium constant Kw or more and the mole number of the tungsten W present in the luminous bulb 10 after evaporated from the electrodes 12 during lamp operation is smaller than the mole number N of the halogen X enclosed in the luminous bulb 10, the halogen X for reaction with the tungsten W evaporated from the electrodes 12 can be constantly ensured. It is evident that even if the metal element Mi (e.g., mercury) having an equilibrium constant Ki of less than the equilibrium constant Kw in formulae (I) and (II) is present in the luminous bulb 10, it does not substantially inhibit the chemical reaction of tungsten with halogen (see FIG. 2), so that the metal element Mi having an equilibrium constant Ki of less than the equilibrium constant Kw substantially can be ignored.

When a metal halide is produced by bonding of halogen and a metal element, one Fe atom is bonded to two Br atoms to produce a bivalent halogenated compound may be produced in some cases such as when Fe is bonded to Br as shown in the following formula (III) (which corresponds to the case where the stoichiometric coefficient ni in the above formula (I) is 2).

$$Fe+2Br \rightarrow FeBr_2 \text{ ("2" is a stoichiometric coefficient)} \quad (III)$$

In this case, for example, when one mole of Fe is present in the luminous bulb, it is ensured that the tungsten evaporated from the electrodes is bonded to halogen more reliably. Therefore, it is preferable to enclose halogen in an amount of at least 2 moles, which is obtained by multiplying the mole number of Fe by the valence (the stoichiometric coefficient) of the halogenated compound of Fe. Generally speaking from an aspect of the chemical equilibrium, it is preferable to enclose halogen in such an amount that the mole number N of halogen X is larger than the sum of the total number (this total number is represented by "$\Sigma(mi \times ni)$") obtained by adding the numbers of all the kinds of the metal element Mi that are obtained by multiplying the mole number mi of the metal element Mi having an equilibrium constant Ki of the equilibrium constant Kw or more by the stoichiometric coefficient ni and the mole number of the tungsten. That is to say, it is preferable to enclose halogen in such an amount that the relationship N>(Σ(mi×ni)+the mole number of the evaporated tungsten) is satisfied.

However, compared with alkali metals (Li Na, K etc) that produces a monovalent halogenated compound, the metal element (Fe or the like) that produces a bivalent or trivalent halogenaged compound has to be bonded to multiple halogen atoms at the same time, so that even if the equilibrium constant Ki of the chemical reaction that produces such a halogenated compound is larger than the equilibrium constant Kw of the chemical reaction of tungsten with halogen, it is experimentally confirmed that the chemical reaction producing a bivalent or trivalent halogenaged compound is difficult to occur, compared with the reaction producing monovalent halogenated compound. Therefore, it is possible to enclose halogen in an amount of a mole number simply exceeding the sum of the total mole number (Σ(mi)) of all the kinds of the metal element and the mole number of the evaporated tungsten.

When the metal element (e.g., alkali metals such as Li, Na, and K) that produces a monovalent halogenated compound is reacted with halogen, it is reacted with only one halogen atom and forms a stable monovalent halogenated compound. For this reason, the metal element that produces a monovalent halogenated compound is bonded to halogen very easily, compared with other metal elements, so that this metal is most likely to inhibit the reaction of the evaporated tungsten with halogen. Therefore, if halogen in a mole number larger than the sum of the total mole number of the metal elements producing a monovalent compound and the mole number of the evaporated tungsten is enclosed in the luminous bulb 10, this constitution ensures that the tungsten evaporated from the electrodes 12 during lamp operation can be bonded to the halogen. Consequently, the tungsten is prevented from being attached onto the inner wall of the luminous bulb 10.

More specifically, it is preferable to enclose halogen in the luminous bulb 10 in a mole number larger than the sum of the total mole number of the metal elements producing a monovalent compound such as alkali metals such as sodium (Na), potassium (K), lithium (Li), cesium (Cs), and rubidium (Rb) that are present in the luminous bulb 10, more preferably indium (In), thallium (Tl), gallium (Ga), silver (Ag) in addition to the alkali metals, and the mole number of the evaporated tungsten.

The highest temperature (at the head portion) of the tungsten electrodes during operation is generally about 3000° C. to 3400° C., and the saturated vapor pressure of the tungsten at these temperatures is about $10^{-3}$ Pa to 1 Pa, and therefore the estimated mole number of the tungsten that is evaporated from the electrodes 12 and floats in the luminous bulb 10 seems very small. Therefore, it is believed that there are many cases where the amount of the tungsten (the mole number of the evaporated tungsten) evaporated and present in the luminous bulb 10 can be ignored, relative to the amounts of the halogen and the metal elements.

FIG. 1 is referred to again. In the discharge lamp 100 of this embodiment, the amount of the metal elements present in the luminous bulb 10 is made as small as possible in order to constitute a lamp such that the mole number of the halogen enclosed in the luminous bulb 10 is larger than the sum of the total mole number of the metal elements (except the tungsten element and the mercury element) present in the luminous bulb 10 and the mole number of the evaporated tungsten. More specifically, in the discharge lamp 100 of this embodiment, the amounts of the impurities contained in the quartz glass constituting the luminous bulb 10 and the impurities contained in the electrodes 12 are made as small as possible, compared with the constitution of the conventional high-pressure discharge lamp 1000.

Table 1 below shows comparison of the amount (ppm) of the impurities contained in the quartz glass of the high-pressure discharge lamp 100 of this embodiment and the amount (ppm) of the impurities contained in the quartz glass of the conventional high-pressure discharge lamp 1000. Table 2 below shows comparison of the amounts (ppm) of the impurities contained in the tungsten electrodes of the two cases. The amount (ppm) of the impurities in Table 1 is indicated by parts per million by weight (ppm by weight).

TABLE 1

| | Al | Li | Ca | K | Na | Cr | Fe | Ni |
|---|---|---|---|---|---|---|---|---|
| | | | | | | | unit: ppm | |
| quartz glass of lamp 100 | 5 | 0.03 | 0.6 | 0.14 | 0.32 | — | 0.2 | — |
| quartz glass of lamp 1000 | 14 | 1.2 | 0.6 | 0.8 | 2.6 | — | 0.25 | — |

TABLE 2

| | Al | Li | Ca | K | Na | Cr | Fe | Ni |
|---|---|---|---|---|---|---|---|---|
| | | | | | | | unit: ppm | |
| tungsten of lamp 100 | <0.1 | 0.1 | 0.3 | 0.7 | 0.2 | 0.2 | 0.9 | 0.1 |
| tungsten of lamp 1000 | <0.1 | 0.1 | 0.3 | 5.5 | 0.4 | 2.4 | 6.5 | 0.5 |

Tables 1 and 2 indicate that in both the cases of the quartz glass and the tungsten electrodes, the amount of the impurities of the high-pressure discharge lamp 100 of this embodiment is smaller than that of the conventional high-pressure discharge lamp 1000. Furthermore, Tables 3 to 6 below show analysis results of the contents (content ratios) of other metals for showing the amounts (ppm) of the impurities contained in each of the quartz glass and the tungsten electrodes of the high-pressure discharge lamp 100 of this embodiment and the conventional high-pressure discharge lamp 1000.

TABLE 3 analysis results of metal content in quartz glass of lamp 100

| | Li | Na | K | Li + Na + K | Cr | Fe | Ni | Cr + Fe + Ni | Al |
|---|---|---|---|---|---|---|---|---|---|
| | | | | | | | | unit: ppm | |
| Sam. 1 | 0.03 | 0.27 | 0.17 | 0.47 | 0.02 | 0.57 | 0.02 | 0.61 | 5 |
| Sam. 2 | 0.06 | 0.55 | 0.19 | 0.80 | 0.07 | 0.35 | 0.11 | 0.53 | 10 |
| Sam. 3 | 0.03 | 0.32 | 0.14 | 0.49 | <0.01 | 0.20 | <0.01 | 0.20 | 7 |
| Sam. 4 | 0.19 | 0.17 | 0.08 | 0.44 | <0.01 | 0.20 | <0.01 | 0.20 | 6.6 |
| Sam. 5 | 0.19 | 0.16 | 0.07 | 0.42 | <0.01 | 0.18 | <0.01 | 0.18 | 6.3 |
| Sam. 6 | 0.18 | 0.12 | 0.09 | 0.39 | 0.02 | 0.21 | <0.01 | 0.23 | 8.7 |
| Sam. 7 | 0.04 | 0.52 | 0.01 | 0.57 | | 0.41 | 0.01 | 0.42 | 5.1 |
| Sam. 8 | 0.04 | 0.66 | 0.08 | 0.78 | 0.01 | 0.16 | <0.01 | 0.17 | 4.7 |
| maximum | 0.19 | 0.66 | 0.19 | 0.80 | 0.07 | 0.57 | 0.11 | 0.61 | 10 |
| minimum | 0.03 | 0.12 | 0.01 | 0.39 | 0.01 | 0.16 | 0.01 | 0.17 | 4.7 |
| average | 0.10 | 0.35 | 0.10 | 0.55 | 0.03 | 0.29 | 0.05 | 0.32 | 6.68 |

TABLE 4 analysis results of metal content in tungsten electrode of lamp 100 unit: ppm

| | Li | Na | K | Li + Na + K | Cr | Fe | Ni | Cr + Fe + Ni |
|---|---|---|---|---|---|---|---|---|
| Sample 9 | | <0.2 | <0.2 | | 0.4 | 1.7 | <0.2 | 2.1 |
| Sample 10 | | <0.2 | <0.2 | | 0.5 | 2.5 | 0.2 | 3.2 |
| Sample 11 | | 0.2 | <0.2 | 0.2 | 0.2 | 1.3 | 0.2 | 1.7 |
| Sample 12 | | <0.2 | <0.2 | | <0.2 | 1.6 | <0.2 | 1.6 |
| Sample 13 | | 0.2 | 0.3 | 0.5 | | | | |
| Sample 14 | <0.2 | 0.5 | 0.2 | 0.7 | <0.2 | 1.0 | <0.2 | 1.0 |
| maximum | 0.0 | 0.5 | 0.3 | 0.7 | 0.5 | 2.5 | 0.2 | 3.2 |
| minimum | 0.0 | 0.2 | 0.2 | 0.2 | 0.2 | 1.0 | 0.2 | 1.0 |
| average | | 0.3 | 0.3 | 0.5 | 0.4 | 1.6 | 0.2 | 1.9 |

TABLE 5 analysis results of metal content in quartz glass of lamp 1000 unit: ppm

| | Li | Na | K | Li + Na + K | Cr | Fe | Ni | Cr + Fe + Ni | Al |
|---|---|---|---|---|---|---|---|---|---|
| Sample 15 | 0.17 | 0.99 | 0.62 | 1.78 | 0.02 | 0.42 | 0.06 | 0.50 | 15 |
| Sample 16 | 0.18 | 0.85 | 0.51 | 1.54 | 0.01 | 0.42 | 0.04 | 0.47 | 16 |
| Sample 17 | 0.33 | 0.65 | 0.82 | 1.80 | 0.02 | 0.34 | 0.03 | 0.39 | 18 |
| Sample 18 | 0.17 | 0.59 | 0.75 | 1.51 | 0.02 | 0.34 | 0.01 | 0.37 | 12 |
| Sample 19 | 0.42 | 0.62 | 0.36 | 1.40 | | 0.08 | <0.01 | 0.08 | 15 |
| Sample 20 | 0.46 | 0.58 | 0.79 | 1.83 | 0.01 | 0.13 | <0.01 | 0.14 | 13 |
| maximum | 0.46 | 0.99 | 0.82 | 1.83 | 0.02 | 0.42 | 0.06 | 0.50 | 18 |
| minimum | 0.17 | 0.58 | 0.36 | 1.40 | 0.01 | 0.08 | 0.01 | 0.08 | 12 |
| average | 0.29 | 0.71 | 0.64 | 1.64 | 0.02 | 0.29 | 0.04 | 0.33 | 14.83 |

TABLE 6 analysis results of metal content in tungsten electrode of lamp 100 unit: ppm

| | Li | Na | K | Li + Na + K | Cr | Fe | Ni | Cr + Fe + Ni |
|---|---|---|---|---|---|---|---|---|
| Sample 9 | <0.2 | 0.4 | 4.5 | 4.9 | 2.4 | 6.5 | 0.5 | 9.4 |
| average | | 0.4 | 4.5 | 4.9 | 2.4 | 6.5 | 0.5 | 9.4 |

Tables 3 to 6 indicate that in both the cases of the quartz glass and the tungsten electrodes, the amount of the impurities of the high-pressure discharge lamp 100 of this embodiment is smaller than that of the conventional high-pressure discharge lamp 1000.

In the lamp 100 of this embodiment in which the amount of the impurities (e.g., alkali metal) in the luminous bulb is made as small as possible, although a high power of a rated power of 150 W (corresponding to a bulb wall load of about 85 W/cm$^2$) was used for operation, surprisingly, blackening on the bulb wall does not occur for a very long time of 5000 hours to 8000 hours. In the case where the amounts of the impurities contained in the quartz glass and the tungsten electrodes of the lamp 100 of this embodiment are in the same level as that of the conventional lamp 1000, when the lamp is operated under the condition of a rated power of 150 W, only one hour operation causes blackening on the bulb wall.

The high-pressure discharge lamp 100 of this embodiment has a very long lifetime that never can be achieved by the prior art with substantially no changes even if about 8000 hours have passed, because blackening on the bulb wall does not occur for a very long time.

The lamp 100 of this embodiment includes the quartz glass and the tungsten electrodes that contain smaller amounts of impurities than those of the conventional lamp 1000, and thus the mole number of bromine (Br) enclosed in the luminous bulb 10 is larger than the sum of the total mole number of the impurities (e.g., alkali metal) present in the luminous bulb 10 and the mole number of the tungsten evaporated from the electrodes 12.

As a result, bromine (Br) that is responsible for halogen transfer cycle in which the evaporated tungsten is returned to the electrodes 12 again has less chances of bonding to impurities released from the quartz glass and the tungsten electrodes during lamp operation. Therefore, blackening on the bulb wall does not occur for a long time.

Figure 3A:
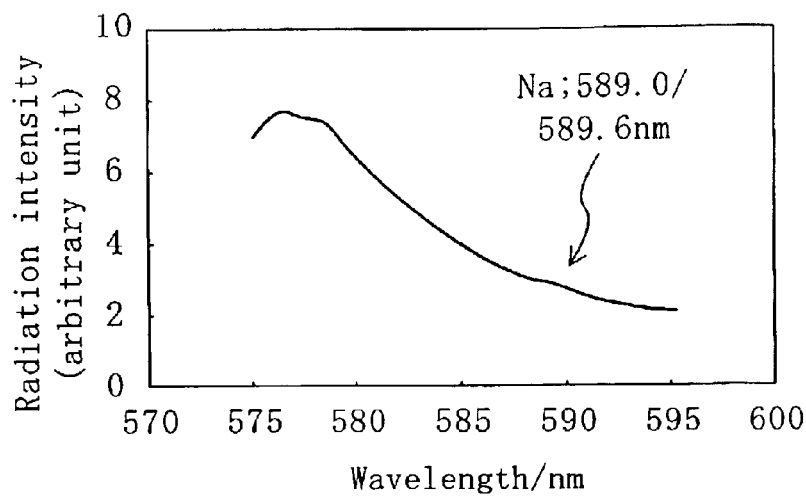
FIGS. 3A to 3C are graphs showing the emission spectrum (radiation intensity) of the lamp 100.
Figure 3B:
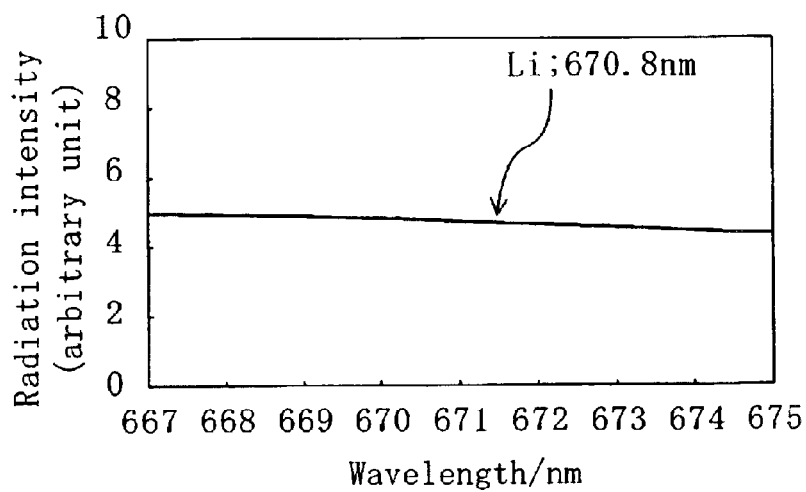
Figure 3C:
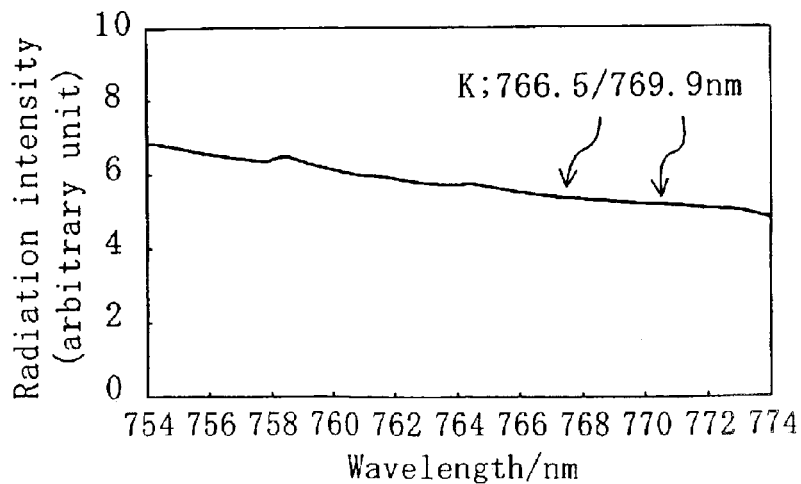
Figure 4A:
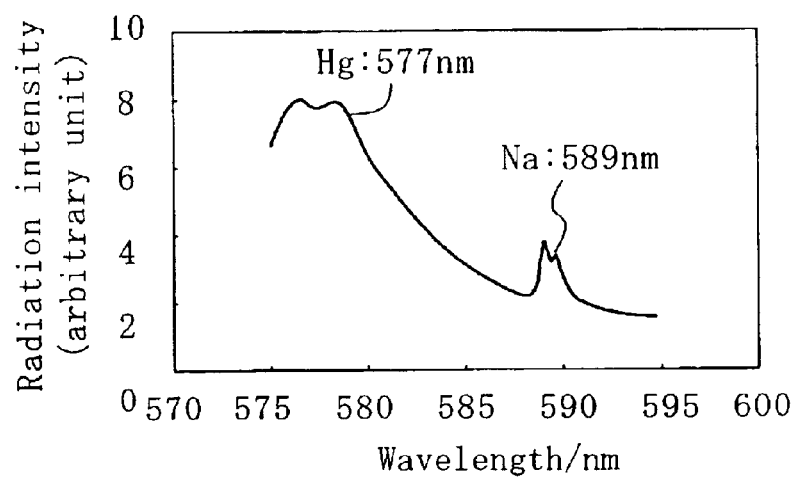
FIGS. 4A to 4C are graphs showing the emission spectrum (radiation intensity) of a conventional lamp 1000.
Figure 4B:
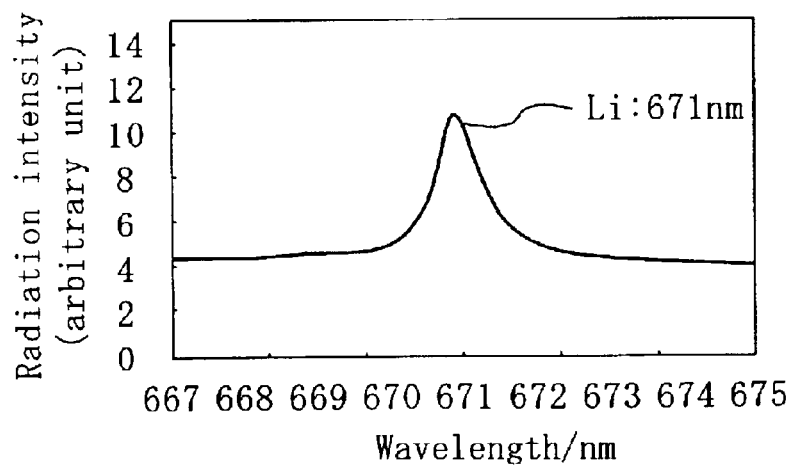
Figure 4C:
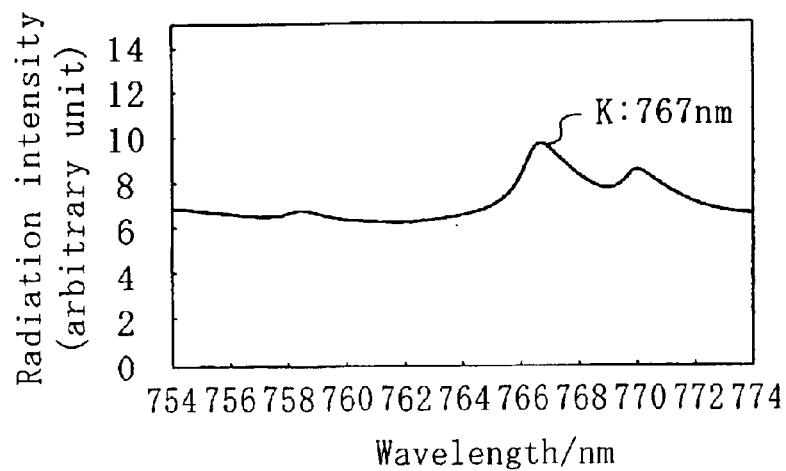

On the other hand, in the conventional lamp 1000, excessive metal elements that might be bonded to bromine Br are present other than the tungsten in the luminous bulb 10, so that these metal elements derive a chance of bonding between bromine Br of tungsten. Therefore, all the evaporated tungsten cannot be returned to the electrodes by the halogen transfer cycle, so that some tungsten is attached onto the bulb wall. As a result, blackening on the bulb wall occurs in a relatively short time. In particular, it is suspected that sodium (Na), potassium (K), lithium (Li), calcium (Ca), chromium (Cr), iron (Fe), and nickel (Ni) might be the impurities that are bonded to bromine (Br). This is because relatively strong emission of sodium (Na), potassium (K), and lithium (Li) from the lamp in which blackening occurs (the conventional lamp 1000) is often observed (see FIG. 4 described later), and calcium (Ca), chromium (Cr), ion (Fe), and nickel (Ni) are detected as attachment of the blackened luminous bulb. FIGS. 3A to 3C show the emission spectrum (radiation strength) of the lamp 100 of this embodiment, and FIGS. 4A to 4C show the emission spectrum (radiation strength) of the conventional lamp 1000. FIGS. 3 and 4 show that in the lamp 100, emissions of sodium (Na), lithium (Li) and potassium (K) are not substantially observed, whereas in the conventional lamp 1000, relatively strong emissions of sodium (Na), potassium (K) and lithium (Li) are observed.

Therefore, it can be said in other words that the lamp 100 of this embodiment includes the quartz glass and the tungsten electrodes containing sodium (Na), potassium (K), lithium (Li), calcium (Ca), chromium (Cr), iron (Fe), and nickel (Ni) in amounts of predetermined levels.

Specifically, the total amount of sodium (Na), potassium (K), lithium (Li), calcium (Ca), chromium (Cr), iron (Fe), and nickel (Ni) in the quartz glass used in the luminous bulb 10 (and the searing portions 20) is, for example, not more than the amount level of the impurities contained in the quartz glass of the conventional lamp 1000 (see Tables 1 and 5), that is, not more than about 2 ppm. More specifically, since the contents (content ratios) of chromium (Cr), iron (Fe), and nickel (Ni) are typically in low levels, it is sufficient that the lamp 100 of this embodiment is constituted such that the total amount of sodium (Na), potassium (K), lithium (Li), and calcium (Ca) in the quartz glass used in the luminous bulb 10 is not more than about 2 ppm.

The total amount of sodium (Na), potassium (K), lithium (Li), calcium (Ca), chromium (Cr), iron (Fe), and nickel (Ni) contained in the electrodes 12 made of tungsten is, for example, not more than the amount level of the tungsten of the conventional lamp 1000 (see Tables 2 and 6), that is, not more than about 15 ppm.

In the lamp 100 of this embodiment, it is preferable that the total amount of sodium (Na), potassium (K), and lithium (Li) of the quartz glass used in the luminous bulb 10 (and the sealing portions 20) is about 2 ppm (this value corresponds to the total amount of sodium (Na), potassium (K), and lithium (Li)) or less, and more preferably about 1 ppm or less. This is because sodium (Na), potassium (K), and lithium (Li) have the emission spectrum in a visible wavelength range (see FIG. 4), so that these impurities (alkali metals) not only make the halogen transfer cycle of tungsten incomplete by bonding to halogen, but also adversely affects the color of the light of the lamp.

More specifically, for example, sodium (Na) provides light emission at a wavelength of around 589 nm, so that it makes the color of the light yellowish. Furthermore, unfortunately, as shown in FIGS. 4A to 4C, even if the amounts of sodium (Na), potassium (K), and lithium (Li) contained in the quartz glass are only a few ppm, the excitation energy level is as low as 2 to 3 eV, so that they emit relatively intense light. When sodium (Na), potassium (K), and lithium (Li) are contained in a reduced level of about 1 ppm or less, the light emission can be relatively weak so as to hardly affect the color of the light (see FIG. 3).

For the same reason as in the description of the quartz glass, in the lamp 100 of this embodiment, it is preferable that the total amount of sodium (Na), potassium (K), and lithium (Li) contained in tungsten constituting the electrode 12 is not more than about 5 ppm, more preferably not more than about 1 ppm.

Furthermore, in the lamp 100 of this embodiment, the total amount of chromium (Cr), iron (Fe), and nickel (Ni) is preferably not more than about 10 ppm, and more preferably not more than about 3 ppm for the following reason. Since halogenated compounds of chromium (Cr), iron (Fe), and nickel (Ni) are very hard to evaporate, if they leak out to the luminous bulb 10 during lamp operation and bond to bromine (halogen), they are immediately attached onto the bulb wall and never evaporate again. That is to say, the leakage of chromium (Cr), iron (Fe), and nickel (Ni) immediately causes blackening on the bulb wall, and causes the lamp to end its life in a very short time. From this viewpoint, it is preferable that the allowable upper limit of chromium (Cr), iron (Fe), and nickel (Ni) is as small as possible. However, from a practical viewpoint, the inventors of the present application have confirmed with experiments that about 3 ppm is sufficient as the upper limit.

About 3 ppm is sufficient as the upper limit from a practical viewpoint for the following reason. Since the weight of the electrodes 12 of high-pressure discharge lamps having a wattage of up to several hundreds watts is in the order of from about several tens of milligrams to a hundred and several tens milligrams, the total mole number of chromium (Cr), iron (Fe), and nickel (Ni) is about in the order of $10^{-4}$ to $10^{-3}$ μmol when the total amount of chromium (Cr), iron (Fe), and nickel (Ni) is about 3 ppm. This value is a sufficiently small amount, which is at least one digit smaller than the total mole number (about 3×10–2 μmol) of the enclosed halogen bromine (Br), and therefore an upper limit of about 3 ppm can be sufficient from a practical viewpoint.

In connection with this, in the lamp 100 of this embodiment, the amount of bromine (Br) enclosed in the luminous bulb 10 is preferably at least ten times the total mole number of the sodium (Na), potassium (K), lithium (Li), calcium (Ca), chromium (Cr), iron (Fe), and nickel (Ni) contained in the electrodes 12. When bromine (Br) is enclosed in an amount of at least ten times the total mole number, even if these impurities leak out from the electrodes 12 and bond to bromine (Br), bromine (Br) in a sufficient amount to return tungsten to the electrodes 12 is constantly present in the luminous bulb 10.

The impurities such as sodium (Na), potassium (K), lithium (Li), and calcium (Ca) are contained in the quartz glass. However, since the temperature of the tungsten electrodes 12 is much higher than that of the quartz glass during lamp operation, the impurities are released more from the tungsten electrodes 12 than from the quartz glass. For this reason, it is sufficient to determine the amount of the bromine (Br) enclosed in the luminous bulb 10 by considering the total mole number of sodium (Na), potassium (K), lithium (Li), calcium (Ca), chromium (Cr), iron (Fe), and nickel (Ni) contained in the electrodes 12 as described above.

Furthermore, in the lamp 100 of this embodiment, it is preferable that the amount of the bromine (Br) enclosed in the luminous bulb 10 is larger than not only the total mole number of sodium (Na), potassium (K), lithium (Li), calcium (Ca), chromium (Cr), iron (Fe), and nickel (Ni) contained in the electrodes 12 and the quartz glass, but also the total mole number of the metal elements except mercury that are typified by sodium (Na), potassium (K), lithium (Li), calcium (Ca), chromium (Cr), iron (Fe), and nickel (Ni) (that is, metal elements that can bond to bromine and prevent tungsten from bonding to bromine) and are present in the luminous bulb 10.

Moreover, it is preferable that the amount of the bromine (Br) is larger, more preferably 10 times to 100 times or more larger, than the total sum of that total mole number and the mole number of tungsten drifting in the luminous bulb 10 that has evaporated from the tungsten electrodes 12 during operation, more preferably ten times to a hundred times or more larger than that (The highest temperature of the electrodes 12 during operation is typically about 3000° C. to about 3400° C., and the saturated vapor pressure of the tungsten at these temperatures is about $10^{-3}$ Pa to $10^{-1}$ Pa. Therefore, the mole number of the tungsten present in the luminous bulb 10 is $10^{-9}$ micromoles to $10^{-6}$ micromoles, and typically is significantly smaller than that of the impurities)

Enclosing bromine in such an amount in the luminous bulb 10 can ensure that bromine capable of bonding to the tungsten evaporated from the electrodes 12 is constantly provided, and therefore the tungsten evaporated from the electrodes 12 can bond to bromine easily at any time. In the case where bromine is enclosed in an amount of ten times or a hundred times or more, even if the amount of the bromine is reduced during lamp operation by adsorption of the electrodes or the glass that might occur in some proportion, the reduction amount can be ignored relative to the amount of the bromine substantially capable of bounding to the tungsten. This means that a complete halogen transfer cycle is guaranteed, and blackening of the luminous bulb 10 substantially can be prevented during a very long time.

However, when the amount of bromine (Br) is too large, the voltage at which discharge of the lamp starts is increased, so that the lamp is hard to operate. The reason is as follows. Halogen elements such as bromine capture electricity very easily because of their large electronegativity, and therefore when Br is present in a large amount, breakdown is caused in the gap between the electrodes (gas in the gap) and discharge occurs. Therefore, when operating the lamp, "electron avalanche" is hard to occur between the electrodes so that the lamp is hard to operate. In this embodiment, the amount of the enclosed bromine is about 1001 μmol/cc or less. When the Br amount exceeds this amount, a high-voltage pulse of 20 kV or more may be applied to the lamp in order to operate the lamp. In the case where a voltage exceeding 20 kV is used in commercial electronic equipment such as TV, it is preferable for safety that the breakdown distance is made long or further a special insulating cover or sheet is attached on the portion in which a high voltage occurs.

In the constitution of the lamp 100 of this embodiment, when the amount of aluminum (Al) contained in the quartz glass is, for example, about 10 ppm or less, preferably about 5 ppm or less, another effect of suppressing devitrification of the luminous bulb 10 can be obtained. The amount of aluminum (Al) in this range can significantly minimize the production of aluminum oxide ($Al_2O_3$) that occurs at a high temperature during lamp operation. As a result, a transparent luminous bulb 10 can be maintained. The production of aluminum oxide reduces the strength of the glass. Therefore, when the aluminum (Al) contained in the quartz glass is, for example, about 10 ppm or less, preferably about 5 ppm or less, another effect of significantly reducing the breakage ratio of the lamp during its lifetime can be obtained. For the same reason, the amount of OH groups (hydroxyl groups) contained in the quartz glass is about 5 ppm or less.

The inventors of the present application found out with experiments that as the content (content ratio) of hydrogen (H) contained in the luminous bulb 10 of a high-pressure discharge lamp is smaller, blackening of the luminous bulb 10 is more hard to occur. Table 7 below shows the relationship between the content (% by volume) of hydrogen in the luminous bulb and blackening. Determination whether or not blackening occurs was performed by visual observation of the lamp after the lamp had been operated for one hour. In Table 7, "o" indicates that there is no blackening and "x" indicates that blackening occurred.

TABLE 7

| | Hydrogen amount in the luminous bulb Vol % | Blackening evaluation |
| --- | --- | --- |
| Sample 1 | 0.04 | o |
| Sample 2 | 0.07 | o |
| Sample 3 | 0.09 | o |
| Sample 4 | 0.14 | o |
| Sample 5 | 0.15 | o |
| Sample 6 | 0.18 | x |
| Sample 7 | 0.21 | o |
| Sample 8 | 0.3 | x |
| Sample 9 | 0.5 | x |
| Sample 10 | 1.4 | x |

From Table 7, it is understood that when the content (% by volume) of hydrogen in the luminous bulb is a certain value or more, blackening occurs. Therefore, in view of prevention of blackening, it is preferable that the content of hydrogen contained in the luminous bulb is 0.15% by volume or less. Table 7 shows the results in the case of the lamp 100 in which both the quartz glass and the tungsten electrodes 12 contain a small amount of impurities. Also in the case of a lamp including the quartz glass and the tungsten electrodes 12 containing a conventional level of impurities, the same tendency was exhibited. The definite reason why in the lamp with a small content of hydrogen, blackening does not occur is not clear, but if we speculate it from the fact that there is a stable compound of H and Br, as typified by HBr (hydrogen bromide), as in the case of a metal element such as Na and Li, it is believed that $H_2$ (gas element) has the property of easily bonding to Br and is a substance that inhibits a reaction of W and Br.

Figure 5:
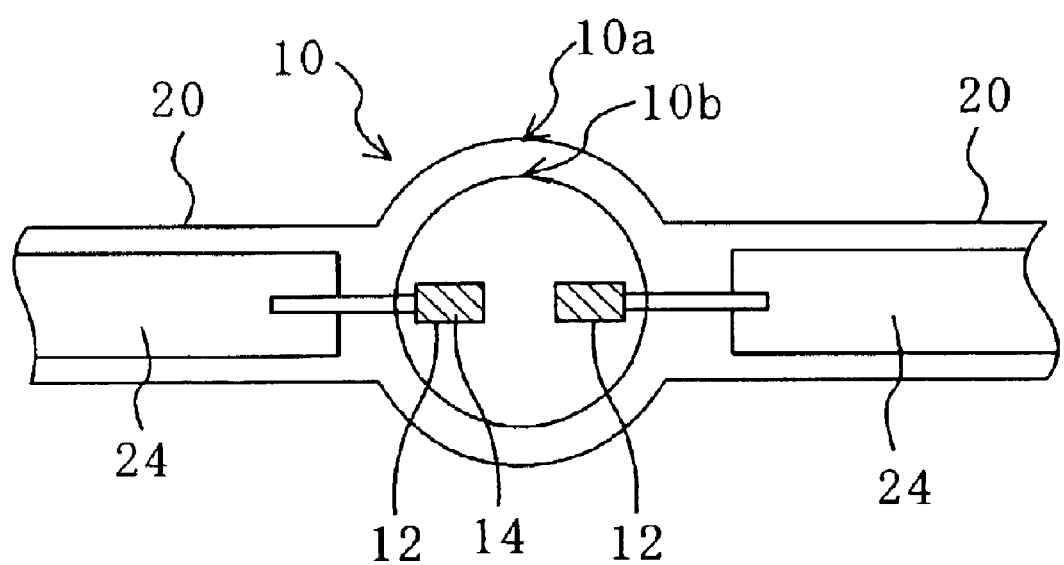
FIG. 5 is an enlarged view generally showing a luminous bulb 10.

Furthermore, the inventors of the present application found out that the residual strain in the luminous bulb 10 of a high-pressure discharge lamp is reduced to a predetermined value or less, the lifetime of the lamp can be prolonged. FIG. 5 shows a structure with an expanded periphery of the luminous bulb 10 of the lamp 100. In the structure shown in FIG. 5, a coil 14 is wound around the head portions of the electrodes 12. In the luminous bulb 10 shown in FIG. 5 having a small residual strain, the tensile stress in the outer surface 10a of the luminous bulb 10 is only about 100 psi or less, and the compressive stress in the inner surface job of the luminous bulb 10 is only about 100 psi or less. On the other hand, in the conventional lamp 1000 having a large residual strain, the tensile stress in the outer surface 10a of the luminous bulb 10 is 700 to 2300 psi (2300 psi=156.5 atm), the compressive stress in the inner surface 10b of the luminous bulb 10 is 700 to 2300 psi. The tensile stress is applied to the outer surface 10a and the compressive stress is applied to the inner surface 10b because of the manner in which the luminous bulb 10 is formed. More specifically, the luminous bulb 10 is formed typically by pressing a glass tube to a mold while heating to soften the glass tube and applying pressure to the inside of the tube, and expanding it. Therefore, the temperature of the outside (outer surface) of the glass tube that is in contact with the mold is first reduced. As a result, a tensile stress is applied to the outer surface 10a and a compressive stress is applied to the inner surface 10b.

Table 8 below shows the lamp characteristics (lamp lifetime) of the luminous bulb 10 having a small residual strain in this embodiment, and Table 9 below shows the lamp characteristics (lamp lifetime) of the conventional luminous bulb having a large residual strain. The test results of the lamp characteristics are obtained by repeating an operation of turning on and off where 15 minutes on and 15 minutes off constitute one cycle to determine how many cycles to take until the lamp stops operating because of breakage or the like.

TABLE 8

| | Lamp without residual strain |
| --- | --- |
| Sample 1 | normal operation up to 1500 cycles |
| Sample 2 | same as above |
| Sample 3 | same as above |
| Sample 4 | same as above |
| Sample 5 | same as above |
| Sample 6 | same as above |
| Sample 7 | same as above |
| Sample 8 | same as above |
| Sample 9 | same as above |
| Sample 10 | same as above |

TABLE 9

| | Lamp with residual strain |
| --- | --- |
| Sample 1 | breakage in 1 cycle |
| Sample 2 | breakage in 2 cycles |
| Sample 3 | breakage in 5 cycles |
| Sample 4 | breakage in 6 cycles |
| Sample 5 | breakage in 2 cycles |
| Sample 6 | breakage in 12 cycles |
| Sample 7 | breakage in 4 cycles |
| Sample 8 | breakage in 2 cycles |
| Sample 9 | breakage in 1 cycle |
| Sample 10 | breakage in 15 cycles |
| Sample 11 | breakage in 7 cycles |
| Sample 12 | breakage in 6 cycles |
| Sample 13 | breakage in 12 cycles |
| Sample 14 | breakage in 9 cycles |

Table 8 indicates that for the lamps with the luminous bulbs having a small residual strain of this embodiment, all of the lamps No. 1 to 10 operate normally until 1500 cycles and thus the characteristics of the lamp are excellent. On the other hand, Table 9 indicates that for the conventional luminous lamps having a large residual strain, many lamps were broken only in a few cycles or broken in at most 15 cycles, and stopped being on. In other words, there is no lamp that operates normally until 1500 cycles, so that it can be understood that the lamp characteristics of the lamps with the luminous bulbs having a small residual strain of this embodiment are excellent that those of the conventional lamps.

Figure 6:
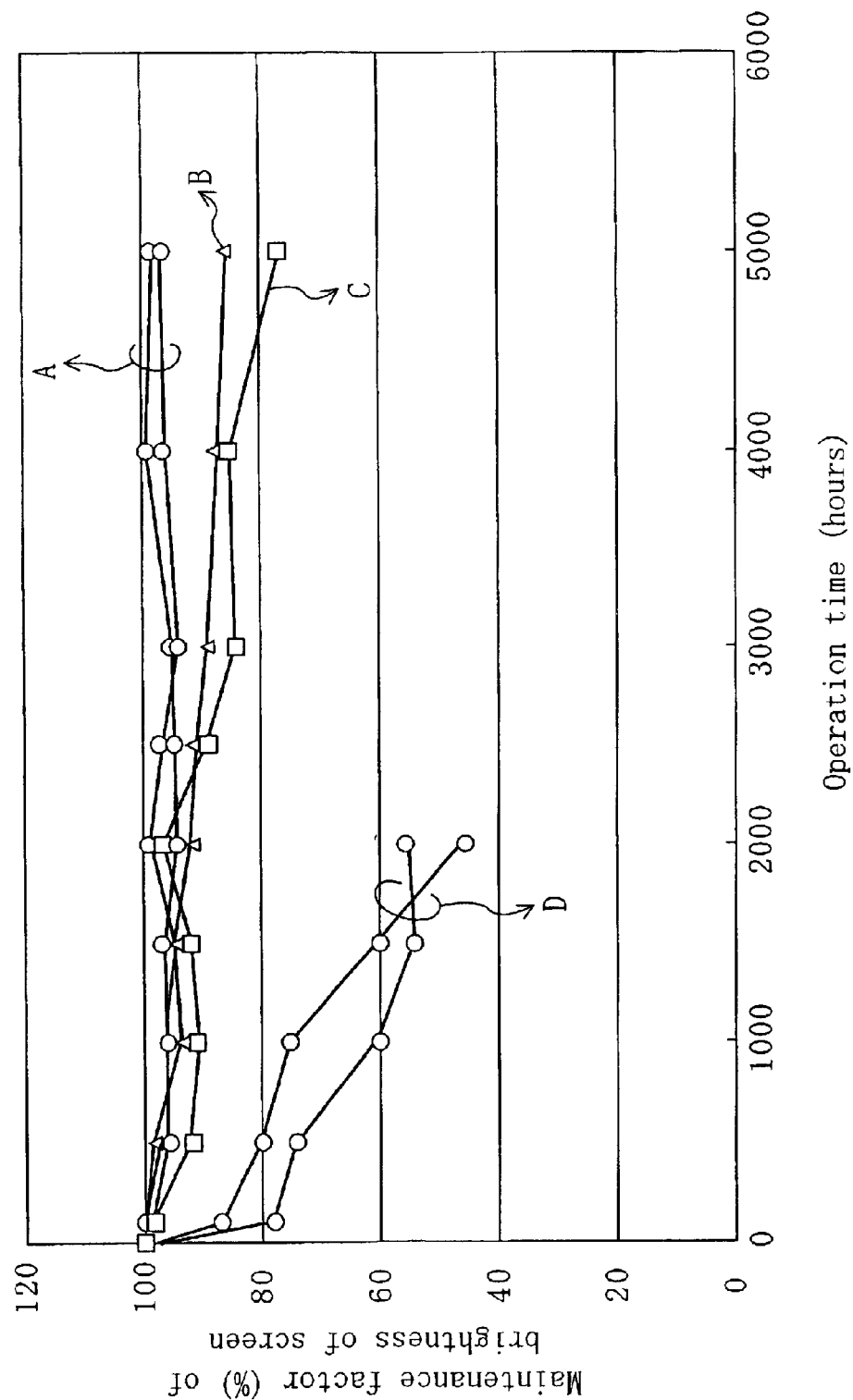
FIG. 6 is a graph showing the life characteristics of a lamp of an embodiment of the present invention.

FIG. 6 shows the lifetime characteristics of the lamps of this embodiment, and lines A to C of FIG. 6 show the maintenance factor (%) of brightness of a screen in a structure in which the lamps of this embodiment are combined with a reflecting mirror. Line A of FIG. 6 shows the case of a lamp including high purity quartz glass (quartz glass containing a small amount of impurities) and high purity tungsten electrodes (tungsten electrodes containing a small amount of impurities). Line B shows the case of a lamp including the conventional quartz glass (quartz glass containing impurities in the conventional level) and high purity tungsten electrodes (tungsten electrodes containing a small amount of impurities). Line C shows the case of a lamp including high purity quartz glass (quartz glass containing a small amount of impurities) and the conventional tungsten electrodes (tungsten electrodes containing impurities in the conventional level). Line D is a comparative example showing the case of a lamp including the conventional quartz glass (quartz glass containing impurities in the conventional level) and the conventional tungsten electrodes (tungsten electrodes containing impurities in the conventional level). In all the cases of lines A to D, lamps containing a small amount hydrogen in the luminous bulb and having a small residual strain in the luminous bulb are used.

FIG. 6 indicates that the lamps of this embodiment (lines A to C) exhibit high maintenance factors (%/o) of brightness, even if the operation time is long, and the lifetime characteristics of the lamps of this embodiment are excellent. All of the lamps of this embodiment (lines A to C) have a maintenance factor (% o) of brightness of 80% or more even at 4000 hours of the operation period. The lamp of line A substantially has a maintenance factor (%) of the same brightness as at the time of the operation start even at the time of 5000 hours. On the other hand, in the lamp of the comparative example (line D), the maintenance factor of brightness is reduced in a comparatively early time from the operation start, and reduced to about 50% at the time of 2000 hours. It is understood dearly that the lifetime characteristics of the lamps of this embodiment (ines A to C) are excellent than those of the comparative example.

(Embodiment 2)

Figure 7:
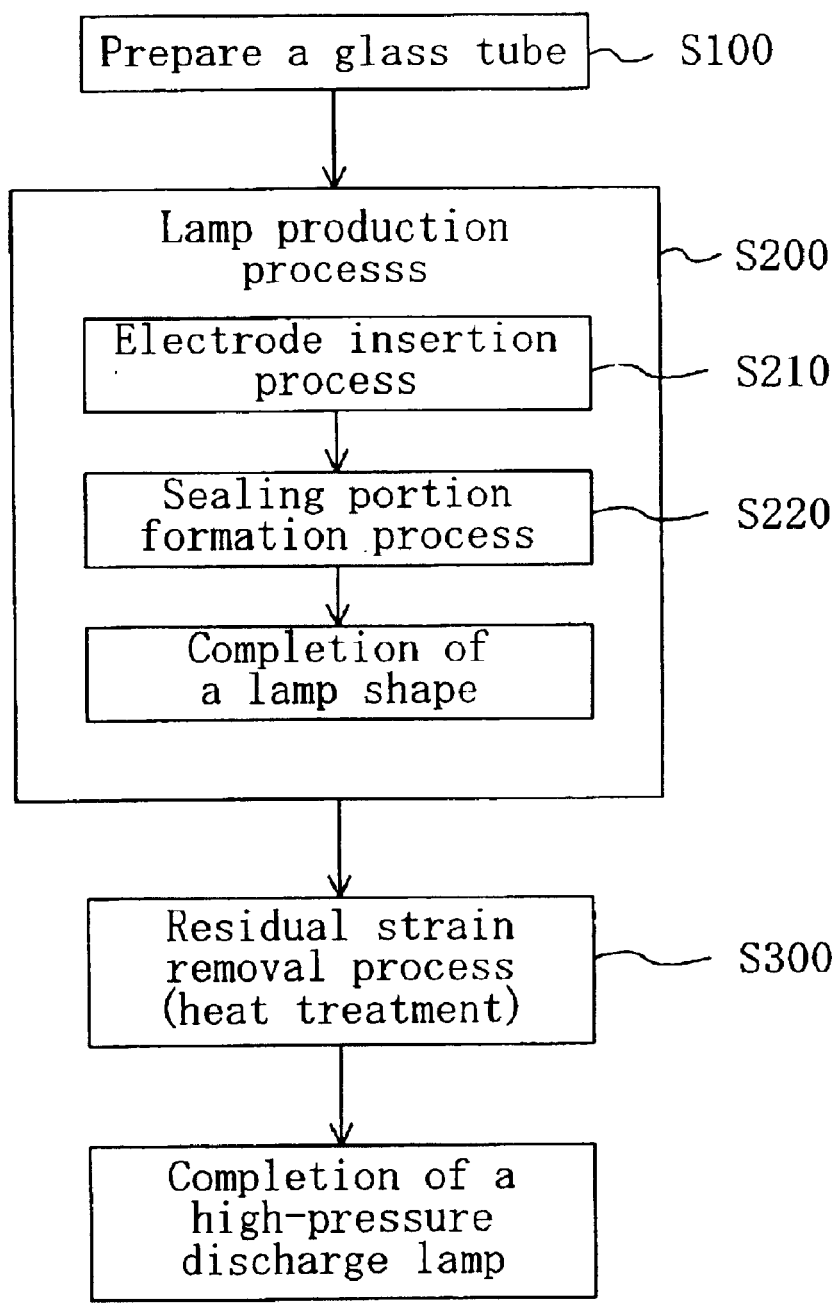
FIG. 7 is a flowchart showing a producing method of an embodiment of the present invention.
Figure 8A:
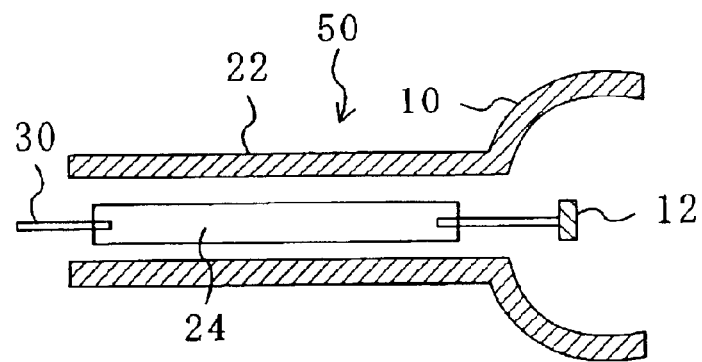
FIGS. 8A to 8C are cross-sectional views of a process sequence for illustrating a lamp production process.
Figure 8B:
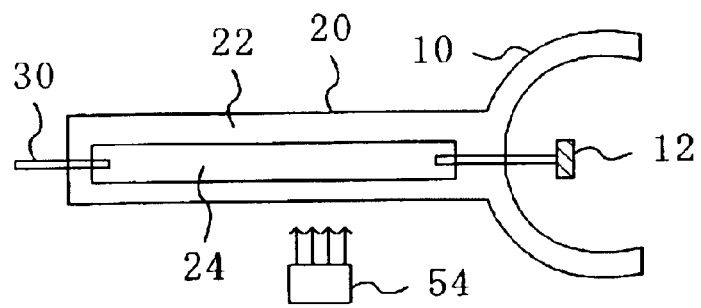
Figure 8C:
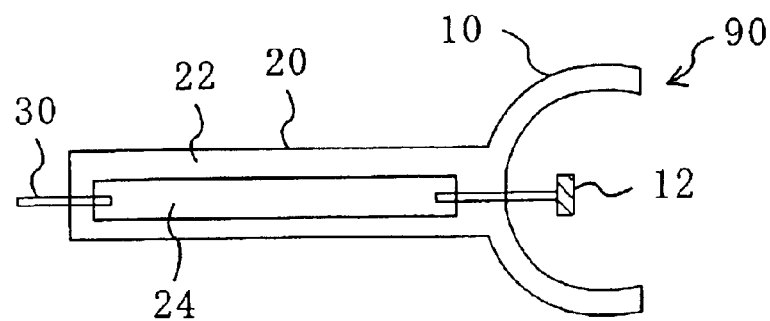

Embodiment 2 of the present invention will be described with reference to FIGS. 7 to 9. In this embodiment, a method for producing a high-pressure discharge lamp whose residual strain in the luminous bulb is smaller than that of the conventional lamp will be described.

The method for producing a high-pressure discharge lamp of this embodiment includes a process of completing a shape of a high-pressure discharge lamp so that a finished lamp shaped structure is obtained and then removing the residual strain of the finished lamp shaped structure. The process of removing the residual strain of the finished lamp shaped structure is a heat treatment process (annealing), and is performed to the finished lamp shaped structure after the finished lamp shaped structure was obtained according to a known lamp production process.

In a conventional method for producing a high-pressure discharge lamp, after a finished lamp shaped structure is obtained by a lamp production process, this finished lamp shaped structure is provided as a high-pressure discharge lamp, and therefore the finished lamp shaped structure is not subjected to a special heat treatment. This is because if a further process is added to the finished lamp shaped structure, the throughput of the high-pressure discharge lamp is reduced, and thus the production efficiency of the lamps is reduced. However, as described above, the inventors of the present invention found out that the lamp characteristics (lamp lifetime) of a high-pressure discharge lamp having a luminous bulb with a small residual strain are excellent, and in order to obtain a high-pressure discharge lamp having excellent lamp characteristics, a method for producing a high-pressure discharge lamp to which a heat treatment to the finished lamp shaped structure is added to provide a high-pressure discharge lamp is realized.

The method for producing a high-pressure discharge lamp of this embodiment will be described as an example with reference to FIG. 7. FIG. 7 is a flowchart for explaining the production method of this embodiment.

First, a quartz glass tube from which a high-pressure discharge lamp is produced is prepared (S100). When producing the lamp 100 having a luminous bulb with a low level of impurities described in Embodiment 1, a glass tube made of high purity quartz glass is prepared.

Next, a finished lamp shaped structure is obtained (S200) by performing a known lamp production process. More specifically, it can be performed as shown in FIG. 8. First, as shown in FIG. 8A, a metal foil (Mo foil) 24 including an electrode 12 and an external lead 30 is inserted into a glass tube 50 for a discharge lamp including a luminous bulb portion 10 and a side tube portion 22 (electrode insertion process S210). Then, as shown in FIG. 8B, the pressure in the glass tube (glass pipe) 50 is reduced (e.g., one atmospheric pressure or less), and the side tube portion 22 of the glass tube 50 is heated and softened with a burner 54, so that the side tube portion 22 and the metal foil 24 are attached tightly, and thus a sealing portion 20 is formed (sealing portion formation process S220). Thereafter, a rare gas, halogen and mercury are enclosed in the luminous bulb portion 10, and then the other side tube portion 22 is subjected to the electrode insertion process S210 and the sealing portion formation process S220, and the luminous bulb 10 is sealed with the pair of sealing portions 20, and thus a finished lamp shaped structure 90 can be obtained, as shown in FIG. 5C.

When the obtained finished lamp shaped structure 90 is subjected to a residual strain removal process S300, a high-pressure discharge lamp in which the residual strain is removed can be obtained. The residual strain removal process S300 is performed, for example, as follows.

First, the finished lamp shaped structure 90 obtained in the lamp production process 200 is placed in a chamber at a high temperature lower than the softening point (1500° C. to 1670° C.) of glass, preferably a high temperature of about 1000° C. to 1100° C. In the chamber, for example, an inert gas (Ar, $N_2$) atmosphere, an ambient atmosphere, or a vacuum atmosphere is prepared. Under these conditions, the finished lamp shaped structure 90 is stored, for example, for one hour or more (in some cases, not more than one hour is possible). Thereafter, for example, when the temperature is reduced to room temperature, for example, over night, the residual stain in the entire of the finished lamp shaped structure 90 is removed, and a high-pressure discharge lamp having excellent lamp lifetime characteristics can be obtained.

In the case of the condition of a temperature higher than 1100° C., the residual strain can be resolved in a shorter high temperature storage time (e.g., only 15 minutes at a temperature of 1215° C., which is the annealing point). However, at temperatures higher than 1100° C. (in some cases, temperatures higher than 1150° C.), the inside of the luminous bulb 10 has a relatively high pressure because of evaporated mercury vapor, so that it is highly possible that the lamp is broken in the chamber during the heat treatment or the crystallization of glass proceeds so as to be devitrified. At temperatures lower than 1000° C., it takes a long time to resolve the strain.

Furthermore, when the inventors of the present application found out that the finished lamp shaped structure 90 is stored at a high temperature for 100 hours or more, surprisingly, the amount of hydrogen contained in the luminous bulb 10 can be reduced. As described above, when the amount of hydrogen contained in the luminous bulb 10 can be reduced, a high-pressure discharge lamp having excellent lamp characteristics can be provided. However, hydrogen (H) is present everywhere in the quartz glass and the atmosphere, so that it is difficult to reduce hydrogen effectively. The inventors of the present invention realized a reduction of the amount of hydrogen contained in the luminous bulb 10 by storing the finished lamp shaped structure 90 at a high temperature for 100 hours or more (e.g., about 100 hours to 200 hours).

Figure 9:
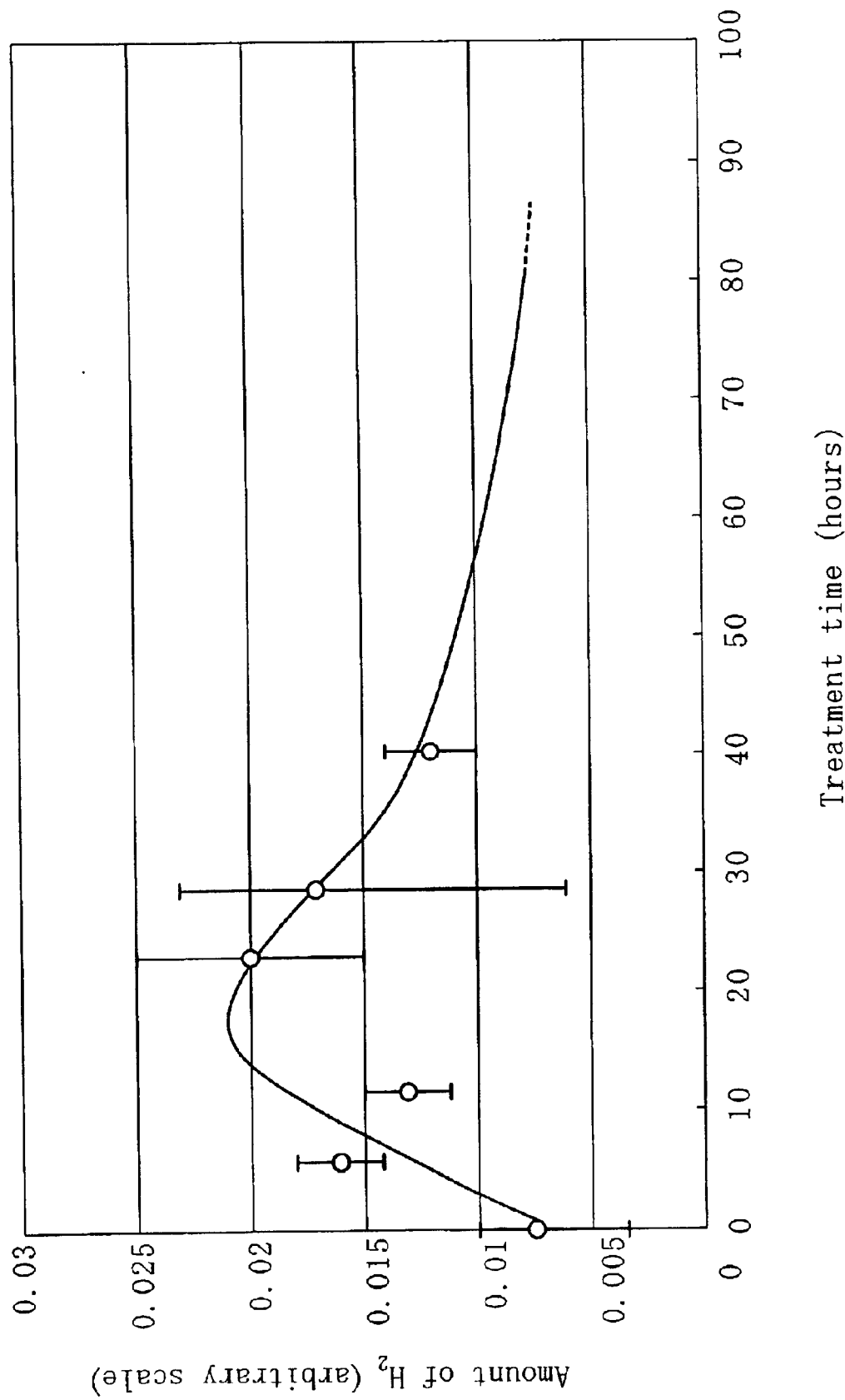
FIG. 9 is a graph showing the relationship between heat treatment time (hours) and the amount of hydrogen (arbitrary scale).

FIG. 9 shows the relationship between the heat treatment time (hours) and the amount of hydrogen (arbitrary scale) in the residual strain removal process S300. Although it is difficult to explain definitely the relationship between the heat treatment time and the amount of hydrogen partly because there are measurement errors of the amount of hydrogen, the measurement results of the inventors of the present invention showed that no hydrogen was detected at a treatment time of 100 hours or more (e.g., 200 hours). The measurement results shown in FIG. 9 are data at a temperature of 1080° C. and in a vacuum atmosphere, but the same measurement results were obtained in the air and an Ar atmosphere.

(Embodiment 3)

Figure 10:
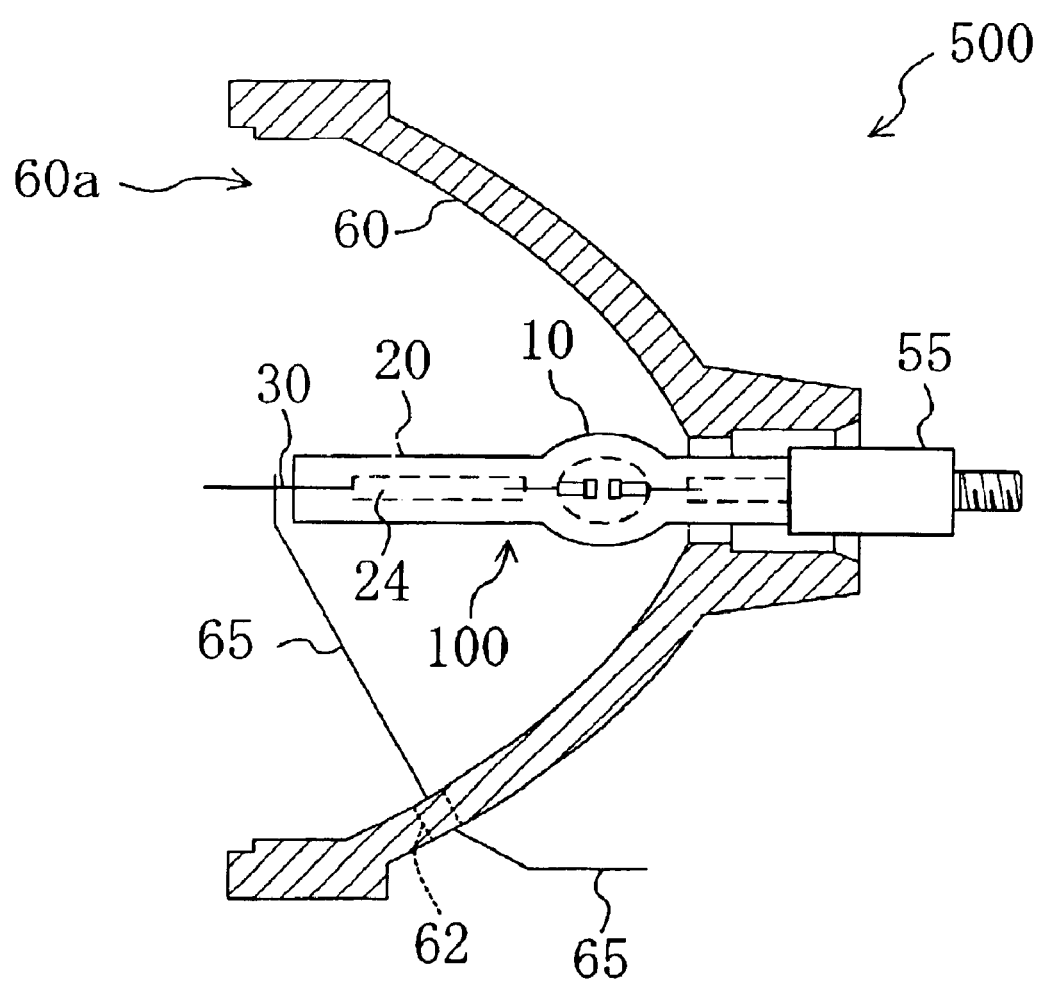
FIG. 10 is a cross-sectional view schematically showing the structure of a lamp unit 500.

The high-pressure discharge lamp 100 of Embodiment 1 can be formed into a lamp unit in combination with a reflecting mirror. FIG. 10 schematically shows the cross-section of a lamp unit 500 provided with the lamp 100 of Embodiment 1.

The lamp unit 500 includes the discharge lamp 100 including a substantially spherical luminous bulb 10 and a pair of sealing portions 20 and a reflecting mirror 60 for reflecting light emitted from the discharge lamp 100.

The reflecting mirror 60 is designed to reflect the light radiated from the discharge lamp 100 such that the light becomes a parallel luminous flux, a condensed luminous flux converged on a predetermined small area, or a divergent luminous flux equal to that emitted from a predetermined small area. As the reflecting mirror 60, a parabolic reflector or an ellipsoidal mirror can be used, for example.

In this embodiment, a lamp base 55 is attached to one sealing portion 20 of the lamp 100, and an external lead extending from the sealing portion 20 is electrically connected to the lamp base. The sealing portion 20 to which the lamp base 55 is attached is adhered to the reflecting mirror 60, for example, with an inorganic adhesive (e.g., cement) for integration. A lead wire 65 is electrically connected to an external lead 30 of the sealing portion 20 positioned on the side of the front opening of the reflecting mirror 60, and the lead wire 65 is extended from the external lead 30 to the outside of the reflecting mirror 60 through an opening 62 for a lead wire of the reflecting mirror 60. For example, a front glass can be attached to the front opening of the reflecting mirror 60.

Such a lamp unit can be used, for example, as a light source for a projection television or a light source for a projector using a liquid crystal projector or a DMD. In addition to these applications, the high-pressure discharge lamp and the lamp unit of this embodiment also can be used for general illumination, a light source for ultraviolet ray steppers, a light source for sports stadiums or a light source for headlights of automobiles.

(Other Embodiments)

In the above embodiments, the case where 150 mg/cc of mercury is enclosed has been described as an example. However, the amount of mercury is not limited thereto and it can be larger or smaller than this amount. That is to say, in the above embodiments, the case where the mercury vapor pressure is about 20 MPa (the case of so-called ultra high pressure mercury lamp) has been described. However, the present invention can apply to a high pressure mercury lamp where the mercury vapor pressure is about 1 MPa. Furthermore, the lamp can be of a short arc type where the gap (arc length) between the pair of electrodes 12 can be short, or the gap can be longer than that. The discharge lamps of the above embodiments can be used by either alternating current lighting or direct current lighting.

Moreover, instead of mercury or in addition to mercury, a metal halide can be enclosed. More specifically, in the above embodiments, a mercury lamp employing mercury as a luminous material has been described as an example of high-pressure discharge lamps. However, the present invention can apply to a high-pressure discharge lamp such as a metal halide lamp enclosing a metal halide. In the structures of the high-pressure discharge lamps of the above embodiments, it is preferable that the amount of mercury enclosed is about 200 mg/cc or less. This is because the pressure in the luminous bulb 10 during operation becomes too high where the amount of mercury enclosed is more than that, so that airtightness cannot be maintained in 2 portion of the molybdenum foils 24 of the sealing portions 20 and therefore it is highly possible that the lamp may be broken. If airtightness can be maintained, the amount of mercury enclosed can be more than about 200 mg/cc. When the amount of mercury enclosed is more than about 200 mg/cc, the thermal conductivity of a gas in the luminous bulb 10 becomes high. Therefore, the heat of the discharge plasma becomes easy to be transmitted to the electrodes 12 and the luminous bulb 10 (quartz glass), so that a higher temperature is reached and thus leakage of impurities from the glass or the electrodes becomes significant. Consequently, when enclosing mercury in an amount of more than 200 mg/cc, the lamp 100 of the above embodiments made of high purity materials can provide larger advantages.

In the above embodiments, the case where the bulb wall load is about 80 W/cm$^2$ has been described. However, the bulb wall load is not limited thereto. It can be smaller or larger than that. In the case of a higher load, the lamp is in operation at a higher temperature, so that leakage of impurities from the glass or the electrodes becomes significant, and therefore the lamp 100 of the above embodiments made of high purity materials can provide larger advantages. However, in the structures of the high-pressure discharge lamps of the above embodiments, it is preferable that the bulb wall load is about 100 W/cm$^2$ or less. This is because when the load exceeds it, the temperature of the luminous bulb 10 becomes too high, so that problems such as deformation and deterioration due to heat are caused. In this case, if these problems can be avoided by adding other means for cooling the luminous bulb 10, the bulb wall load can be larger than 100 W/cm$^2$.

In the above embodiments, the case where the rated power is about 150 W has been described. However, the rated power is not limited thereto. It can be 150 W or more, or 150 W or less. The structure of the high-pressure discharge lamp of the above embodiments is suitable especially to a lamp having comparatively large power of 50 W or more. Since the lamp having large power is operated in a higher temperature state, leakage of impurities from the glass or the electrodes becomes significant, and therefore the lamp 100 of the above embodiments made of high purity materials can provide larger advantages in an operation in such a state.

In the high-pressure discharge lamp of the above embodiments, a lamp enclosing bromine (Br) as halogen has been described as an example, but the halogen can be chlorine (Cl) or iodine (I).

In the above embodiments, a so-called discharge lamp that radiates by discharge between a pair of electrodes opposed to each other in the luminous bulb has been described as an example. However, the present invention can apply not only to the discharge lamps but also electric lamps as shown in FIGS. 11 and 12.

Figure 11:
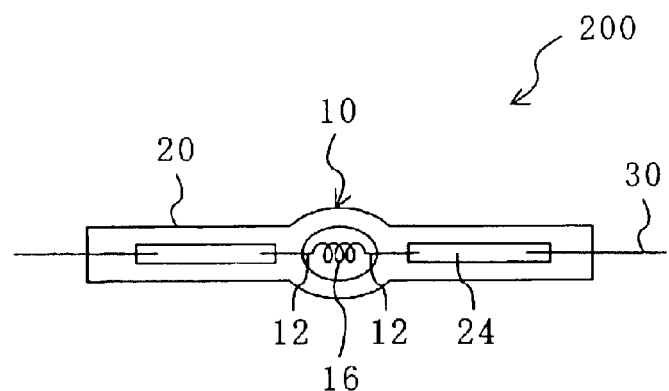
FIG. 11 is a cross-sectional view schematically showing the structure of an electric lamp 200.

FIG. 11 schematically shows the structure of an electric lamp 200 in which a pair of tungsten electrodes 12 is connected with a coil 16 of tungsten in the structure of the high-pressure discharge lamp 100 of the above embodiments. The electric lamp 200 is substantially the same structure as that of the lamp 100 of Embodiment 1, except that the pair of tungsten electrodes 12 is connected with the tungsten coil 16 and that mercury is not contained in the luminous bulb (bulb) 10. The tungsten coil 16 is made of high purity tungsten containing a small amount of impurities, preferably also high purity quartz glass as the quartz glass. The electric lamp 200 having such a structure has a very long life as the lamp 100 of the above embodiments. It is more preferable to reduce the residual strain of the luminous bulb 10, because the lamp is less likely to be broken.

Figure 12:
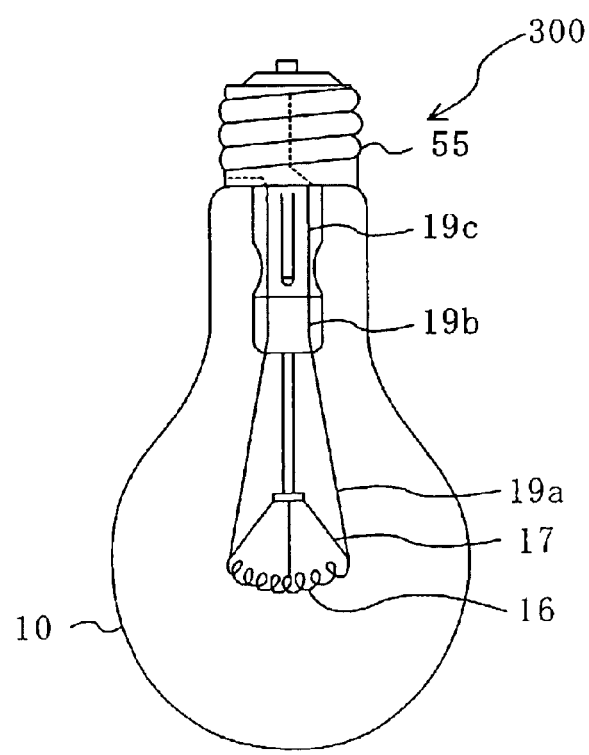
FIG. 12 is a cross-sectional view schematically showing the structure of an electric lamp 300.
Figure 13:
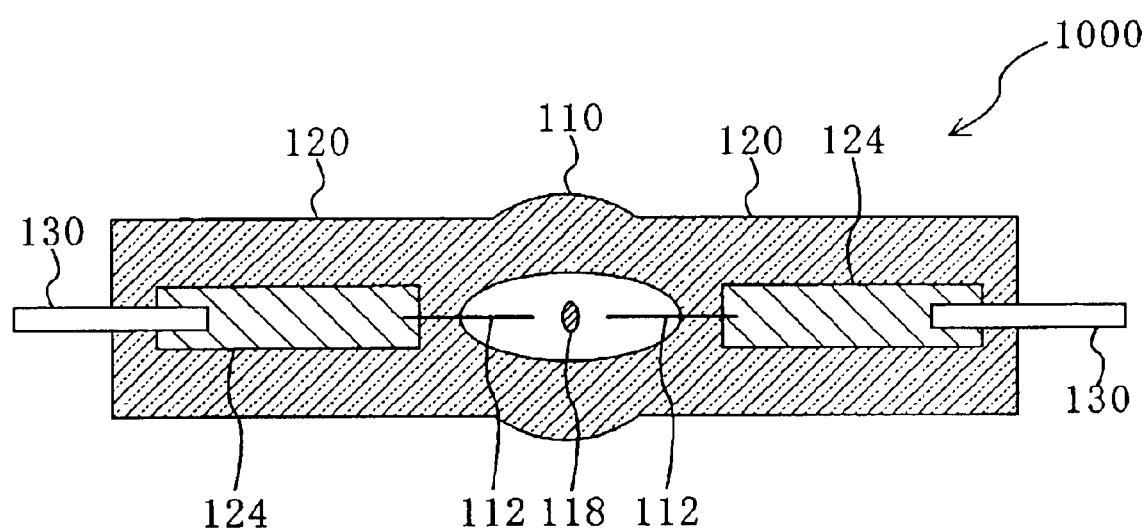
FIG. 13 is a cross-sectional view schematically showing the structure of a conventional high-pressure discharge lamp 1000.

FIG. 12 shows another example of an electric lamp having a long life. FIG. 12 schematically shows an electric lamp (lamp) 300 having a similar structure as that of an incandescent lamp used in ordinary houses. The electric lamp 300 has the same structures as those of well-known incandescent lamp, except that the high purity tungsten as described above is used for a tungsten filament 16, and halogen and argon (Ar) or xenon (Xe) are used as gases enclosed in the bulb 10. High purity tungsten can be used for an anchor 17, an internal lead 19a, a sealed lead 19b and an external lead 19c.

In the above, preferable embodiments of the present invention have been described, but this description does not limit the present invention and there are various modifications.

INDUSTRIAL APPLICABILITY

The present invention provides a high-pressure discharge lamp having a long life (e.g., 5000 hours to 10000 hours or more), even if it is used under high output conditions that might cause a lamp of the prior art to end its life in an early time. the high-pressure discharge lamp of the present invention in combination, for example, with a reflecting mirror can be used as a light source for a projection television or a light source for a liquid crystal projector or a projector using a DMD. Furthermore, in addition to these applications, the lamp of the present invention can be used for general illumination, a light source for ultraviolet ray steppers, a light source for sports stadiums or a light source for headlights of automobiles.

What is claimed is:

1. A mercury lamp comprising:
   a luminous bulb enclosing at least mercury, a rare gas and halogen in the bulb and made substantially of quartz glass; and
   an electrode made substantially of tungsten and disposed in the luminous bulb,
   wherein a mole number of the halogen is larger than a sum of a total mole number of metal elements, except a tungsten element and a mercury element, that have a property of bonding to the halogen and are present in the luminous bulb and a mole number of the tungsten present in the luminous bulb by evaporation from the electrode during lamp operation.

2. The mercury lamp according to claim 1, wherein
   when Mi denotes each kind of the metal elements, except the tungsten element and the mercury element, and mi is a mol number of the metal element Mi, and ni is a stoichiometric coefficient of the metal element Mi,
   the mole number of the halogen is larger than a sum of the mole number of the tungsten and a total number ($\Sigma$(mi×ni)) obtained by adding mole numbers of all the kinds of the metal element Mi that are obtained by multiplying the mole number mi of the metal element Mi by the stoichiometric coefficient ni.

3. The mercury lamp according to claim 2,
   wherein the metal element is at least one selected from the group consisting of sodium (Na), potassium (K), lithium (Li), chromium (Cr), iron (Fe), and nickel (Ni).

4. The mercury lamp according to claim 2,
   wherein a content of hydrogen (H) contained in the luminous bulb is 0.15% by volume or less.

5. The mercury lamp according to claim 2,
   wherein a tensile stress on an outer surface of the luminous bulb is 100 psi or less, and a compressive stress on an inner surface of the luminous bulb is 100 psi or less.

6. The mercury lamp according to claim 1,
   wherein the metal element is at least one selected from the group consisting of sodium (Na), potassium (K), lithium (Li), chromium (Cr), iron (Fe), and nickel (Ni).

7. The mercury lamp according to claim 6,
   wherein a content of hydrogen (H) contained in the luminous bulb is 0.15% by volume or less.

8. The mercury lamp according to claim 6,
   wherein a tensile stress on an outer surface of the luminous bulb is 100 psi or less, and a compressive stress on an inner surface of the luminous bulb is 100 psi or less.

9. The mercury lamp according to claim 1,
   wherein a content of hydrogen (H) contained in the luminous bulb is 0.15% by volume or less.

10. The mercury lamp according to claim 9,
    wherein a tensile stress on an outer surface of the luminous bulb is 100 psi or less, and a compressive stress on an inner surface of the luminous bulb is 100 psi or less.

11. The mercury lamp according to claim 1,
    wherein a tensile stress on an outer surface of the luminous bulb is 100 psi or less, and a compressive stress on an inner surface of the luminous bulb is 100 psi or less.

12. A mercury lamp comprising:
a luminous bulb enclosing at least mercury, a rare gas and halogen in the bulb and made substantially of quartz glass; and
an electrode made substantially of tungsten and disposed in the luminous bulb, wherein
in the case where halogen enclosed in the luminous bulb is denoted by X, a mole number of the halogen X is denoted by N, each kind of metal elements that have a property of bonding to the halogen X and are present in the luminous bulb is denoted by Mi, a mole number of the metal element Mi is denoted by mi, a stoichiometric coefficient of the metal element Mi is denoted by ni, and tungsten is denoted by W,
when an equilibrium constant in a chemical reaction of the following formula (I) is denoted by Ki: $Mi+niX \rightarrow MiX_{ni}$ (I), and
an equilibrium constant in a chemical reaction of the following formula (II) is denoted by Kw: $W+X \rightarrow WX$ (II),
the mole number N of the halogen X enclosed in the luminous bulb is larger than a sum of a total mole number of the metal elements Mi having an equilibrium constant Ki of the equilibrium constant Kw or more and a mole number of the tungsten W present in the luminous bulb by evaporation from the electrode during lamp operation.

13. The mercury lamp according to claim 12,
wherein the mole number N of halogen X is larger than a sum of the mole number of the tungsten and a total mole number ($\Sigma(mi \times ni)$) obtained by adding the mole numbers of all the kinds of the metal element Mi that are obtained by multiplying the mole number mi of the metal element Mi having an equilibrium constant Ki of the equilibrium constant Kw or more by the stoichiometric coefficient ni.

14. The mercury lamp according to claim 13,
wherein the metal element is at least one selected from the group consisting of sodium (Na), potassium (K), lithium (Li), chromium (Cr), iron (Fe), and nickel (Ni).

15. The mercury lamp according to claim 13,
wherein a content of hydrogen (H) contained in the luminous bulb is 0.15% by volume or less.

16. The mercury lamp according to claim 13,
wherein a tensile stress on an outer surface of the luminous bulb is 100 psi or less, and a compressive stress on an inner surface of the luminous bulb is 100 psi or less.

17. The mercury lamp according to claim 12,
wherein the metal element is at least one selected from the group consisting of sodium (Na), potassium (K), lithium (Li), chromium (Cr), iron (Fe), and nickel (Ni).

18. The mercury lamp according to claim 12,
wherein a content of hydrogen (H) contained in the luminous bulb is 0.15% by volume or less.

19. The mercury lamp according to claim 12,
wherein a tensile stress on an outer surface of the luminous bulb is 100 psi or less, and a compressive stress on an inner surface of the luminous bulb is 100 psi or less.

20. A mercury lamp comprising:
a luminous bulb enclosing at least mercury, a rare gas and halogen in the bulb and made substantially of quartz glass; and
an electrode made substantially of tungsten and disposed in the luminous bulb,
wherein a mole number of the halogen enclosed in the luminous bulb is larger than a sum of a total mole number of sodium (Na), potassium (K), and lithium (Li) that are present in the luminous bulb and a mole number of the tungsten present in the luminous bulb by evaporation from the electrode during lamp operation.

21. The mercury lamp according to claim 20,
wherein the mole number of the halogen is larger than a sum of a total mole number of sodium (Na), potassium (K), lithium (Li), cesium (Cs) and rubidium (Rb) that are present in the luminous bulb and the mole number of the tungsten.

22. A mercury lamp comprising:
a luminous bulb enclosing at least mercury, a rare gas and halogen in the bulb and made substantially of quartz glass; and
an electrode made substantially of tungsten and disposed in the luminous bulb,
wherein a mole number of the halogen enclosed in the luminous bulb is larger than a sum of a total mole number of metal elements that are present in the luminous bulb and produce a monovalent halide and a mole number of the tungsten present in the luminous bulb by evaporation from the electrode during lamp operation.

23. A mercury lamp comprising:
a luminous bulb enclosing at least mercury, a rare gas and halogen in the bulb and made substantially of quartz glass; and
an electrode made substantially of tungsten and disposed in the luminous bulb,
wherein a content of each of sodium (Na), potassium (K), and lithium (Li) contained in the electrode is 1 ppm or less.

24. The mercury lamp according to claim 23,
wherein a content of each of sodium (Na), potassium (K), and lithium (Li) contained in the quartz glass in the luminous bulb is 1 ppm or less.

25. The mercury lamp according to claim 24, wherein the mole number of the halogen enclosed in the luminous bulb is larger than a total mole number of sodium (Na), potassium (K), and lithium (Li) that are present in the electrode.

26. The mercury lamp according to claim 25, wherein a content of chromium (Cr), iron (Fe), and nickel (Ni) contained in the electrode is 3 ppm or less.

27. The mercury lamp according to claim 24, wherein a content of chromium (Cr), iron (Fe), and nickel (Ni) contained in the electrode is 3 ppm or less.

28. The mercury lamp according to claim 23,
wherein the mole number of the halogen enclosed in the luminous bulb is larger than a total mole number of sodium (Na), potassium (K), and lithium (Li) that are present in the electrode.

29. The mercury lamp according to claim 28,
wherein the mole number of the halogen enclosed in the luminous bulb is at least five times larger than a total mole number of sodium (Na), potassium (K), and lithium (Li) that are present in the electrode.

30. The mercury lamp according to claim 23,
wherein a content of chromium (Cr), iron (Fe), and nickel (Ni) contained in the electrode is 3 ppm or less.

31. The mercury lamp according to claim 28, wherein a content of chromium (Cr), iron (Fe), and nickel (Ni) contained in the electrode is 3 ppm or less.

32. The mercury lamp according to claim 30,
wherein the mole number of the halogen enclosed in the luminous bulb is larger than a total mole number of sodium (Na), potassium (K), lithium (Li), chromium (Cr), iron (Fe), and nickel (Ni) that are present in the electrode.

33. The mercury lamp according to claim 32,
wherein the mole number of the halogen enclosed in the luminous bulb is at least five times larger than a total mole number of sodium (Na), potassium (K), lithium (Li), chromium (Cr), iron (Fe), and nickel (Ni) that are present in the electrode.

34. The mercury lamp according to any one of claims 20, 22, and 23,
wherein a content of hydrogen (H) contained in the luminous bulb is 0.15% by volume or less.

35. The mercury lamp according to claims 20, 22, and 23,
wherein a tensile stress on an outer surface of the luminous bulb is 100 psi or less, and a compressive stress on an inner surface of the luminous bulb is 100 psi or less.

36. The mercury lamp according to any one of claims 1, 12, 20, and 23,
wherein a content of OH groups contained in the quartz glass in luminous bulb is 5 ppm or less.

37. The mercury lamp according to any one of claims 1, 12, 20, 22, and 23,
wherein a content of aluminum (Al) contained in the quartz glass in luminous bulb is 10 ppm or less.

38. The mercury lamp according to any one of claims 1, 12, 20, and 23,
wherein the amount of halogen enclosed in the luminous bulb is 100 $\mu$mol/cm$^3$ or less.

39. The mercury lamp according to any one of claims 1, 12, 20, 22, and 23,
wherein the halogen enclosed in the luminous bulb is at least one of bromine (Br) or iodine (I).

40. The mercury lamp according to any one of claims 1, 12, 20, 22, and 23,
wherein a bulb wall load of the luminous bulb is 80 W/cm$^2$ or more.

41. The mercury lamp according to any one of claims 1, 12, 20, 22, and 23,
wherein an amount of the mercury (Hg) enclosed in the luminous bulb is from 150 mg/cm$^3$ to 300 mg/cm$^3$, and a mercury vapor pressure during lamp operation is from 15 MPa to 30 MPa.

42. A lamp unit comprising the mercury lamp according to any one of claims 1, 12, 20, 22, and 23, and a reflecting mirror for reflecting light emitted from the mercury lamp.

43. An electric lamp comprising:
a bulb enclosing at least a rare gas and halogen therein; and
a filament that connects a pair of internal leads arranged in the bulb and made substantially of tungsten,
wherein a mole number of the halogen is larger than a sum of a total mole number of metal elements, except a tungsten element, that have a property of bonding to the halogen and are present in the luminous bulb and a mole number of the tungsten present in the luminous bulb by evaporation from the filament during lamp operation.

* * * * *

UNITED STATES PATENT AND TRADEMARK OFFICE
CERTIFICATE OF CORRECTION

PATENT NO.    : 6,844,679 B1
DATED         : January 18, 2005
INVENTOR(S)   : Makoto Horiuchi et al.

It is certified that error appears in the above-identified patent and that said Letters Patent is hereby corrected as shown below:

Column 24,
Line 22, "mol" should be -- mole --

Column 27,
Lines 24 and 32, after "20," insert -- 22, --

Signed and Sealed this

Ninth Day of August, 2005

JON W. DUDAS
*Director of the United States Patent and Trademark Office*